United States Patent
Kimmel et al.

(10) Patent No.: US 8,280,150 B2
(45) Date of Patent: Oct. 2, 2012

(54) METHOD AND APPARATUS FOR DETERMINING SIMILARITY BETWEEN SURFACES

(75) Inventors: Ron Kimmel, Haifa (IL); Alexander Bronstein, San Jose, CA (US); Michael Bronstein, Santa Clara, CA (US)

(73) Assignee: Technion Research & Development Foundation Ltd., Haifa (IL)

( * ) Notice: Subject to any disclaimer, the term of this patent is extended or adjusted under 35 U.S.C. 154(b) by 1136 days.

(21) Appl. No.: 12/086,623

(22) PCT Filed: Dec. 17, 2006

(86) PCT No.: PCT/IL2006/001451
§ 371 (c)(1),
(2), (4) Date: Jun. 16, 2008

(87) PCT Pub. No.: WO2007/069260
PCT Pub. Date: Jun. 21, 2007

(65) Prior Publication Data
US 2009/0028442 A1      Jan. 29, 2009

Related U.S. Application Data

(60) Provisional application No. 60/750,837, filed on Dec. 16, 2005.

(51) Int. Cl.
*G06K 9/00*      (2006.01)
(52) U.S. Cl. ........................ 382/154; 382/118
(58) Field of Classification Search ................ None
See application file for complete search history.

(56) References Cited

U.S. PATENT DOCUMENTS

| | | | | |
|---|---|---|---|---|
| 6,807,290 | B2 * | 10/2004 | Liu et al. | 382/118 |
| 6,947,579 | B2 | 9/2005 | Bronstein | |
| 2004/0076313 | A1 * | 4/2004 | Bronstein et al. | 382/118 |
| 2009/0180672 | A1 * | 7/2009 | Ishiyama | 382/118 |

FOREIGN PATENT DOCUMENTS
WO    WO 2007/069260    6/2007

OTHER PUBLICATIONS

Memoli et al. (Apr. 2004) "Comparing point clouds." IMA Preprint Series #1978, University of Minnesota.*
Moenning et al. (2003) "Fast marching farthest point sampling for implicit surfaces and point clouds." Proc. Eurographics 2003.*
Kimmel et al. (Jul. 1998) "Computing geodesic paths on manifolds." Proc. Nat'l Acad. Sci., vol. 95 pp. 8431-8435.*
Communication Pursuant to Article 94(3) EPC Dated Mar. 18, 2010 From the European Patent Office Re.: Application No. 06821644.9.

(Continued)

*Primary Examiner* — Bhavesh Mehta
*Assistant Examiner* — Barry Drennan
(74) *Attorney, Agent, or Firm* — D'vorah Graeser; Graeser Associates International Inc

(57) ABSTRACT

A method for determining similarity between a non-planar probe surface and a non-planar model surface is disclosed. The method comprises calculating an extremal value of an objective function describing embedding of the probe surface into an embedding space having a non-constant sectional curvature; and determining similarity between the probe surface and the model surface based on the extremal value.

20 Claims, 15 Drawing Sheets
(11 of 15 Drawing Sheet(s) Filed in Color)

OTHER PUBLICATIONS

International Preliminary Report on Patentability Dated Jun. 26, 2008 From the International Bureau of WIPO Re.: Application No. PCT/IL2006/001451.

Communication Pursuant to Article 94(3) EPC Dated Feb. 11, 2009 From The European Patent Office Re.: Application No. 06821644.9.

Bronstein et al. "Three-Dimensional Face Recognition", International Journal of Computer Vision, 64(1): 5-30, 2005. Abstract, P3, col. 2, Last Paragraph, p. 8, col. 2, Paragraphs 3, 4, p. 10, Section 2.3, p. 12, Section 3.1, p. 16, col. 2, Last Paragraph, p. 21, Section 4.6.

Elad et al. "On Bending Invariant Signatures for Surfaces", IEEE Transactions on Pattern Analysis and Machine Intelligence, 25(10): 1285-1295, 2003. p. 1286, col. 1, Paragraph 4, P.1287, Coil, Last Paragraph, Fig.2.

Alexander M Bronstein et al: "Three-Dimensional Face Recognition" International Journal of Computer Vision, Kluwer Academic Publisher, BO, vol. 64, No. 1, Aug. 1, 2005, pp. 5-30.

Elad A et al: "On bending invariant signatures for surfaces" IEEE Transactions on Pattern Analysis and Machine Intelligence, IEEE, New York, NY, US, vol. 25, No. 10, Oct. 2003, pp. 1285-1295.

Moenning et al., "Fast marching farthest poing sampling for implicit surfaces and point clouds." Proc. Eurographics 2003. Published 2003.

Memoli et al., "Comparing point clouds". IMA Preprint Series # 1978, University of Minnesota. published Apr. 2004.

Kimmet et al., "Computing geodesic paths on manifolds." Proc. Nat'l Acad., vol. 95 pp. 8431-8435. Published Jul. 1998.

L. K. Saul, "Nonlinear Dimensionality Reduction by Locally Linear Embedding," Science, 2000, 290(5500):2323-2326.

G. Zigelman and R. Kimmel and N. Kiryati, "Texture mapping using surface flattening via multi-dimensional scaling," IEEE Trans. Visualization and computer graphics, 2002, 9(2):198-207).

N. Linial and E. London and Y. Rabinovich, "The geometry of graphs and some its algorithmic applications," Combinatorica, 1995, 15(2):333-344].

J.A. Sethian, "A fast marching level set method for monotonically advancing fronts, "Proc. Nat, Acad Sci., 1996, 93 (4): 1591-1595.

N.J Kalton et al: "Distances between Banach spaces," Forums Math, 1999, 11 (1): 17-48.

F Me'moli et al: "A Theoretical and Computaional Framework for Isometry Invariant Recognition of Point Cloud Data," Foundations of Computational Mathematics, 2005. 593): 313-347.

Eldar et al., "The Farthest point strategy for progressive image sampling", IEEE Trans. Image Processing, 1997, 6(9): 1305-1315.

Chang et al., "Face recorgnition using 2D and 3D facial data ,"ACM Workshop on Multimodal User Authentication, 2003, pp. 25-32.

Flynn et al., Assessment of time dependency in face recognition: an initial study, Audio- and Video-Based Biometric Person Authentication, 2003, pp. 44-51.

I Brog et al., "Modern multdimensional scaling—theory and applications," Springer-Verlag, Berlin Heidelberg New York, 1997.

Burago et al., "Acourse in metric geometry," American Mathematical Society, 2001.

M. Reuter, F.-E. Wolter and N. Peinecke. Laplace-Beltrami spectra as "Shape-DNA" of surfaces and solids. Computer-Aided Design 38 (4), pp. 342-366, Apr. 2006.

C. Wang, M. M. Bronstein, N. Paragios, A. M. Bronstein, "Discrete minimum distortion correspondence problems for non-rigid shape matching", Proc. Conf. on Scale Space and Variational Methods in Computer Vision (SSVM), 2011.

A Spectral Technique for Correspondence Problems Using Pairwise Constraints M. Leordeanu & M. Hebert, ICCV 2005.

International search report and written opinion for PCT/IL2006/001451 dated Dec. 17, 2006.

OA for EP patent application 06821644.9 dated: Feb. 11, 2009.

OA for EP patent application 06821644.9 dated: Mar. 18, 2010.

OA for EP patent application 06821644.9 dated: Jun. 29, 2010.

SIAM J. Sci. Comput., vol. 28, pp. 1812-1836, 2006.

PPNAS, vol. 103, No. 5, 1168-1172, Jan. 31, 2006.

\* cited by examiner

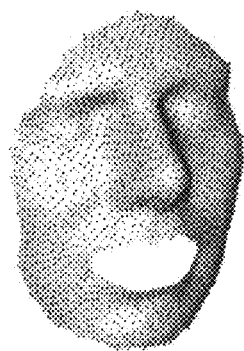 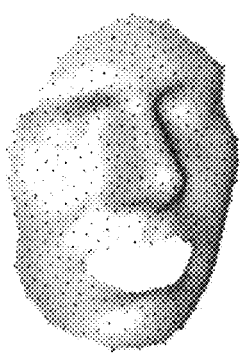 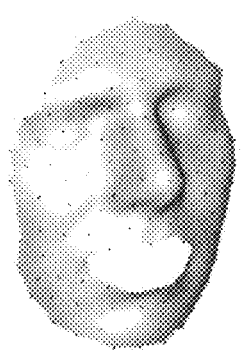 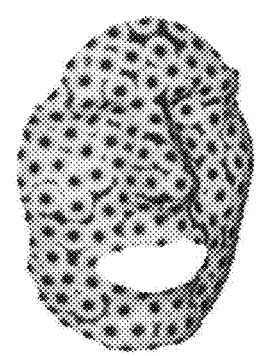
Fig. 7a     Fig. 7b     Fig. 7c     Fig. 7d
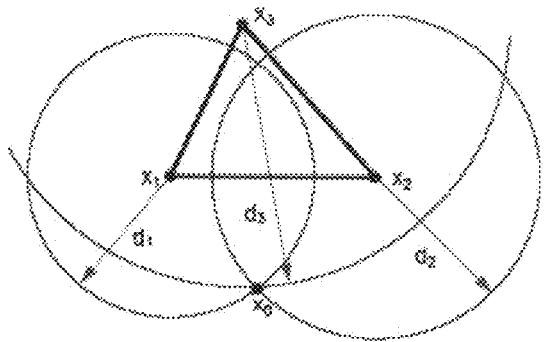 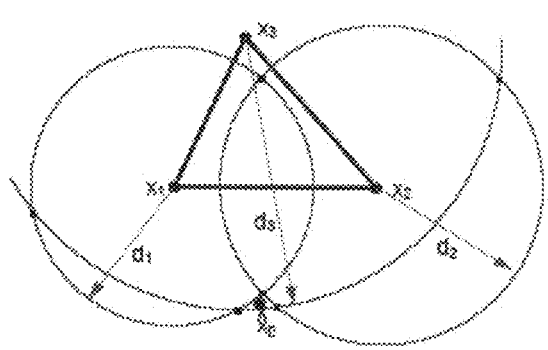
Fig. 8a            Fig. 8b Vertices: 3693   Faces: 7360   Edges: 11052

Vertices: 4075   Faces: 8144   Edges: 12228

Vertices: 2828   Faces: 5652   Edges: 8478

Vertices: 1939   Faces: 3874   Edges: 5811

Vertices: 441   Faces: 800   Edges: 1240

Vertices: 938   Faces: 1872   Edges: 2808 objective function objective function

METHOD AND APPARATUS FOR DETERMINING SIMILARITY BETWEEN SURFACES

RELATED APPLICATIONS

This Application is a National Phase of PCT Patent Application No. PCT/IL2006/001451 having International filing date of Dec. 17, 2006, which claims the benefit of U.S. Provisional Patent Application No. 60/750,837 filed on Dec. 16, 2005. The contents of the above Applications are all incorporated herein by reference.

FIELD AND BACKGROUND OF THE INVENTION

The present invention relates to automatic object recognition and, more particularly, but not exclusively to a method and apparatus for determining similarity between surfaces, e.g., for matching purposes.

Matching of surfaces has recently become an important task of computer vision and is needed in a variety of applications, such as biometric, security and medical applications. In security systems, for example, surface matching can be used for face recognition, so as to grant or deny access to select individuals, to alert when an individual is recognized, or to track an individual as the individual travels amongst a plurality of people. In like manner, home automation systems can employ surface matching to distinguish among residents of a home, so that the features of the system can be customized for each resident. In medical applications, surface matching can be employed for registration an image scan so as to provide a basis for localizing or tracking a medical instrument with respect to anatomical features or other elements in the image.

Humans have a remarkable ability to identify objects, such as faces of individuals, in a rapid and seemingly effortless fashion. It develops over several years of childhood and results in the intelligence to recognize thousands of faces and other objects throughout our lifetime. This skill is quite robust, and allows humans to correctly identify others despite changes in appearance, like aging, hairstyle, facial hair and expression.

For decades, building automatic systems to duplicate human face identification capability has been an attractive goal for many academic researchers and commercial companies around the world. Various attempts in the past were hampered by a lack of appropriate image acquisition means, efficient identification algorithms with required accuracy, and computation power to implement such algorithms.

In general, modern object recognition approaches can be divided into two wide categories: 2D approaches, using only image information (which can be either grayscale or color), and 3D approaches, which incorporate three-dimensional information as well.

While simpler in data acquisition (which permits real-time surveillance applications, such as face recognition from a video-taped crowd in pubic places), the 2D approach suffers from sensitivity to illumination conditions and object orientation. Since the image represents the light reflected from the object's surface at a single observation angle, different illumination conditions can result in different images, which are likely to be recognized as different objects.

The 3D approach provides face geometry information, which is typically independent of viewpoint and lighting conditions, and as such is complementary to the two-dimensional image. Three-dimensional information carries the actual geometry of the surface of the object, including depth information which allows easy segmentation of the surface from the background. The fundamental question in the 3D approach is how to efficiently yet accurately quantify the similarity between a given reference surface (a model), and some other surface (a probe), which is potentially a deformed version of the model.

Typically, such quantification is achieved by calculating the so-called "distance" between the model and the probe. It is desired, typically, to capture the distinction of the intrinsic properties of the model and probe (which are associated with their metric structure), while ignoring the extrinsic properties that describe the way the surfaces deform. A deformation that preserves the intrinsic structure of the surface is referred to as "an isometry". In Euclidian spaces, for example, translation, rotation and reflection of a body are isometrics, because they are not associated with the structure of the body. In non-Euclidian spaces, isometrics may also include bending of surfaces.

U.S. Pat. No. 6,947,579, the contents of which are hereby incorporated by reference discloses a three-dimensional face recognition technique in which three-dimensional topographical data of a geometric body in a form of a triangulated manifold is converted into a series of geodesic distances between pairs of points of the manifold. A bending invariant representation of the geometric body is then provided by forming a low dimensional Euclidean representation of the geodesic distances. The bending invariant representation is suitable for matching the geometric body with other geometric bodies. The matching is performed by calculating the distance between the respective geometric bodies, based on the bending invariant representations thereof. The presence or absence of a match is determined by thresholding the calculated distance.

The above approach is based on known algorithms such as multidimensional scaling (MDS), dimensionality reduction and texture mapping (see, e.g., A. Elad and R. Kimmel, "On bending invariant signatures for surfaces," IEEE Trans. PAMI, 2003, 25(10):1285-1295; S. T. Roweis and L. K. Saul, "Nonlinear Dimensionality Reduction by Locally Linear Embedding," Science, 2000, 290(5500):2323-2326; and G. Zigelman and R. Kimmel and N. Kiryati, "Texture mapping using surface flattening via multi-dimensional scaling," IEEE Trans. Visualization and computer graphics, 2002, 9(2):198-207).

Also known are methods in which graph theory is employed in the context of representation of discrete metric spaces [N. Linial and E. London and Y. Rabinovich, "The geometry of graphs and some its algorithmic applications," Combinatorica, 1995, 15(2):333-344]. A graph is embedded in Euclidean space such that the distances between nodes in the graph are close to the geometric distance of the vectors representing the Euclidean space.

However, when dealing with abstract metric spaces like graphs, or even points clouds with local distances, smoothness of the underlying geometry can not be assumed, and the embedding is a much harder problem. One of the caveats of the Euclidean embedding approach is the fact that such approach introduces a metric distortion, because a Riemannian surface cannot be perfectly represented in a finite-dimensional Euclidean space. One of the simplest examples is the $K_{1,3}$ graph which cannot be embedded in Euclidean space without distortion.

There is thus a widely recognized need for, and it would be highly advantageous to have, a method and apparatus for determining similarity between surfaces devoid of the above limitations.

SUMMARY OF THE INVENTION

According to one aspect of the present invention there is provided a method of determining similarity between a non-planar probe surface represented by a probe point-cloud and a non-planar model surface represented by a model point-cloud, the method comprises: calculating an extremal value of an objective function describing embedding of the probe surface into an embedding space having a non-constant sectional curvature; and determining similarity between the probe surface and the model surface based on the extremal value.

According to another aspect of the present invention there is provided a method of searching a library of non-planar model surfaces for at least a partial match to a non-planar probe surface, the non-planar probe surface being represented by a probe point-cloud and each non-planar model surface being represented by a model point-cloud, the method comprising, for each non-planar model surface, performing the method of claim 1 so as to determine similarity between the probe surface and the model surface, thereby determining the presence or absence of at least a partial match.

According to further features in preferred embodiments of the invention described below, the method further comprises calculating a matrix of geodesic distances corresponding to the probe point-cloud.

According to still further features in the described preferred embodiments the calculation of the extremal value comprises multiresolution optimization.

According to still further features in the described preferred embodiments the method further comprises selecting a subset of the probe point-cloud corresponding to a predetermined patch of the probe surface, wherein the calculation of the extremal value is based on the subset.

According to yet another aspect of the present invention there is provided apparatus for determining similarity between a non-planar probe surface represented by a probe point-cloud and a non-planar model surface represented by a model point-cloud, the method comprising: an extremal value calculator, for calculating an extremal value of an objective function describing embedding of the probe surface into an embedding space having a non-constant sectional curvature; and a similarity determinator operable to determine the similarity between the probe surface and the model surface based on the extremal value.

According to further features in preferred embodiments of the invention described below, the apparatus further comprises a matrix calculator for calculating a matrix of geodesic distances corresponding to the probe point-cloud.

According to still further features in the described preferred embodiments the geodesic distances are calculated using the fast marching method.

According to still further features in the described preferred embodiments the extremal value calculator is operable to employ multiresolution optimization.

According to still further features in the described preferred embodiments the apparatus further comprises a subset selector for selecting a subset of the probe point-cloud corresponding to a predetermined patch of the probe surface, wherein the extremal value calculator is operable to use the subset for calculating the extremal value.

According to still further features in the described preferred embodiments for each pair of points in the subset, the difference between a geodesic distance characterizing the pair in the point-cloud and a geodesic distance characterizing the pair in the patch is higher than a predetermined threshold.

According to still further features in the described preferred embodiments for each pair of points in the subset, the sum of geodesic distances in the patch from each point in the pair to a boundary of the patch is higher than a geodesic distance characterizing the pair in the point-cloud.

According to still further features in the described preferred embodiments the objective function is selected so as to allow calculation of a partial embedding distance between the probe surface and the model surface.

According to still further features in the described preferred embodiments the objective function is selected so as to allow calculation of a Gromov-Hausdorff distance between the probe surface and the model surface.

According to still further features in the described preferred embodiments the embedding space is a two-dimensional space.

According to still further features in the described preferred embodiments the embedding space is a polyhedral approximation of the model surface.

According to still further features in the described preferred embodiments the polyhedral approximation comprises a triangulated manifold.

According to still further features in the described preferred embodiments the method further comprises constructing the polyhedral approximation from the model point-cloud.

According to still further features in the described preferred embodiments the apparatus further comprises a polyhedron constructor for constructing the polyhedral approximation from the model point-cloud.

According to still further features in the described preferred embodiments the objective function comprises a sum of local distortions, each characterizing embedding of a pair of points in the probe point-cloud into the embedding space.

According to still further features in the described preferred embodiments the sum is a weighted sum.

According to still further features in the described preferred embodiments at least a few of the local distortions in the sum comprise a function of the difference between a first geodesic distance defined in the probe surface and a second geodesic distance, corresponding to the first geodesic distance and being defined in the embedding space.

According to still further features in the described preferred embodiments the first geodesic distance characterizes a pair of points of the probe point-cloud and the second geodesic distance characterizes images of the pair of points.

According to still further features in the described preferred embodiments the first geodesic distance characterizes a pair of points of the embedding space and the second geodesic distance characterizes images of the pair of points.

According to still further features in the described preferred embodiments the first geodesic distance is a distance between a first point of the probe point-cloud and an image of a first point of the embedding space, and the second geodesic distance is a distance between a second point of the embedding space and an image of a second point of the probe point-cloud.

According to still further features in the described preferred embodiments the calculation of the extremal value comprises interpolating geodesic distances in the polyhedral approximation of the model surface.

According to still further features in the described preferred embodiments the extremal value calculator comprises an interpolator for interpolating geodesic distances in the polyhedral approximation of the model surface.

According to still further features in the described preferred embodiments the extremal value is calculated by an iterative procedure.

According to still further features in the described preferred embodiments the iterative procedure traverses the triangulated manifold while ensuring that images of points in the point-clouds are always in a plane of one triangle of the triangulated manifold.

According to still further features in the described preferred embodiments a direction of the traverse is determined by a procedure selected from the group consisting of the steepest decent method, the fixed step gradient method, the conjugate gradient method, the Newton method and any combination thereof.

According to still further features in the described preferred embodiments the function of the difference between the first geodesic distance and the second geodesic distance is a non-linear function.

According to still further features in the described preferred embodiments the non-linear function comprises finite norms of the local distortions.

According to still further features in the described preferred embodiments the non-linear function is constrained by a constraint in an infinite norm representation.

According to still further features in the described preferred embodiments the method further comprises employing penalty barrier method for de-constraining the non-linear function.

According to still further features in the described preferred embodiments the probe surface and the model surface represent faces.

The present invention successfully addresses the shortcomings of the presently known configurations by providing a method and apparatus for determining similarity between surfaces.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a flowchart diagram of a method suitable for determining similarity between surfaces, according to various exemplary embodiments of the present invention;

FIG. 2 is a schematic illustration of an apparatus for determining similarity between surfaces, according to various exemplary embodiments of the present invention;

Figure 3A:
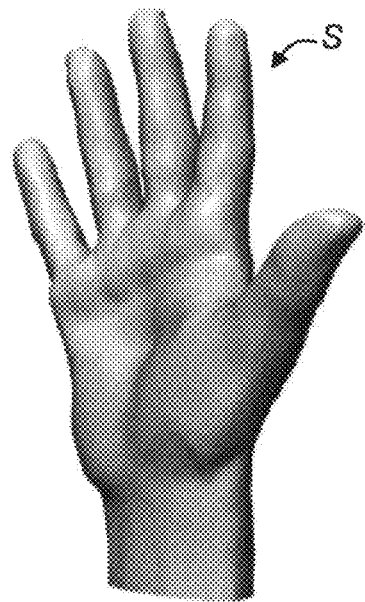
Figure 3B:
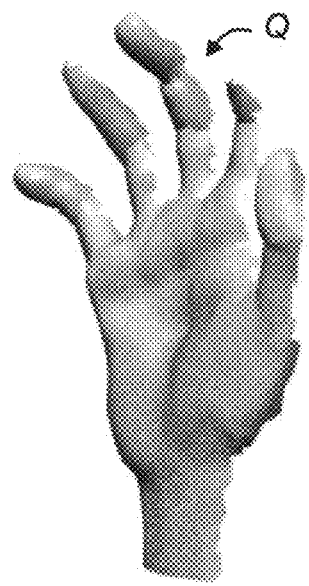
Figure 4A:
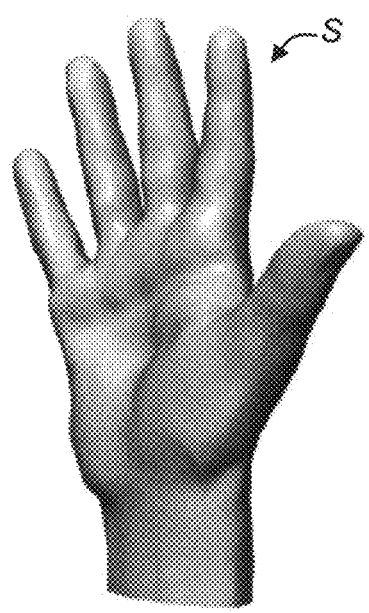
Figure 4B:
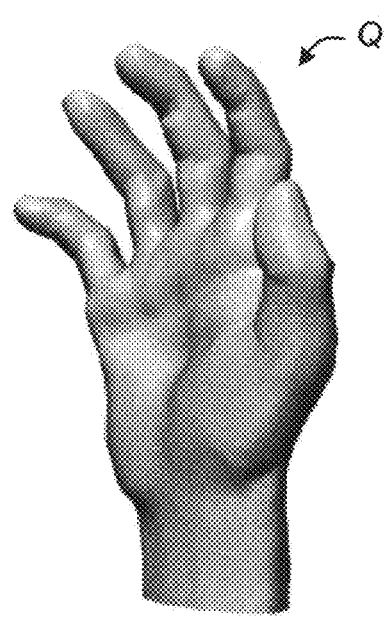
Figure 5A:
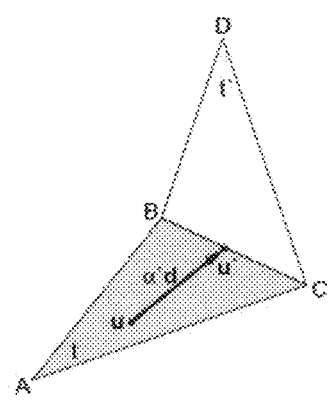
Figure 5B:
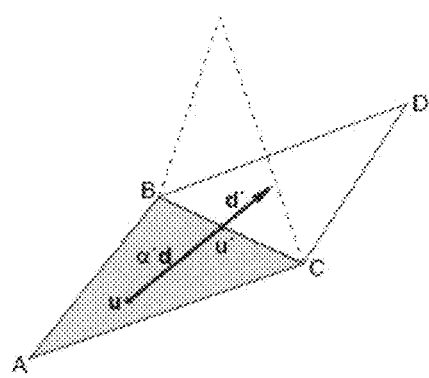
Figure 5C:
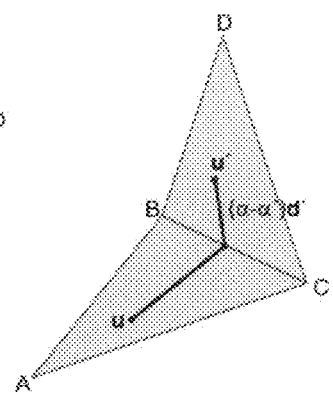
Figure 6:
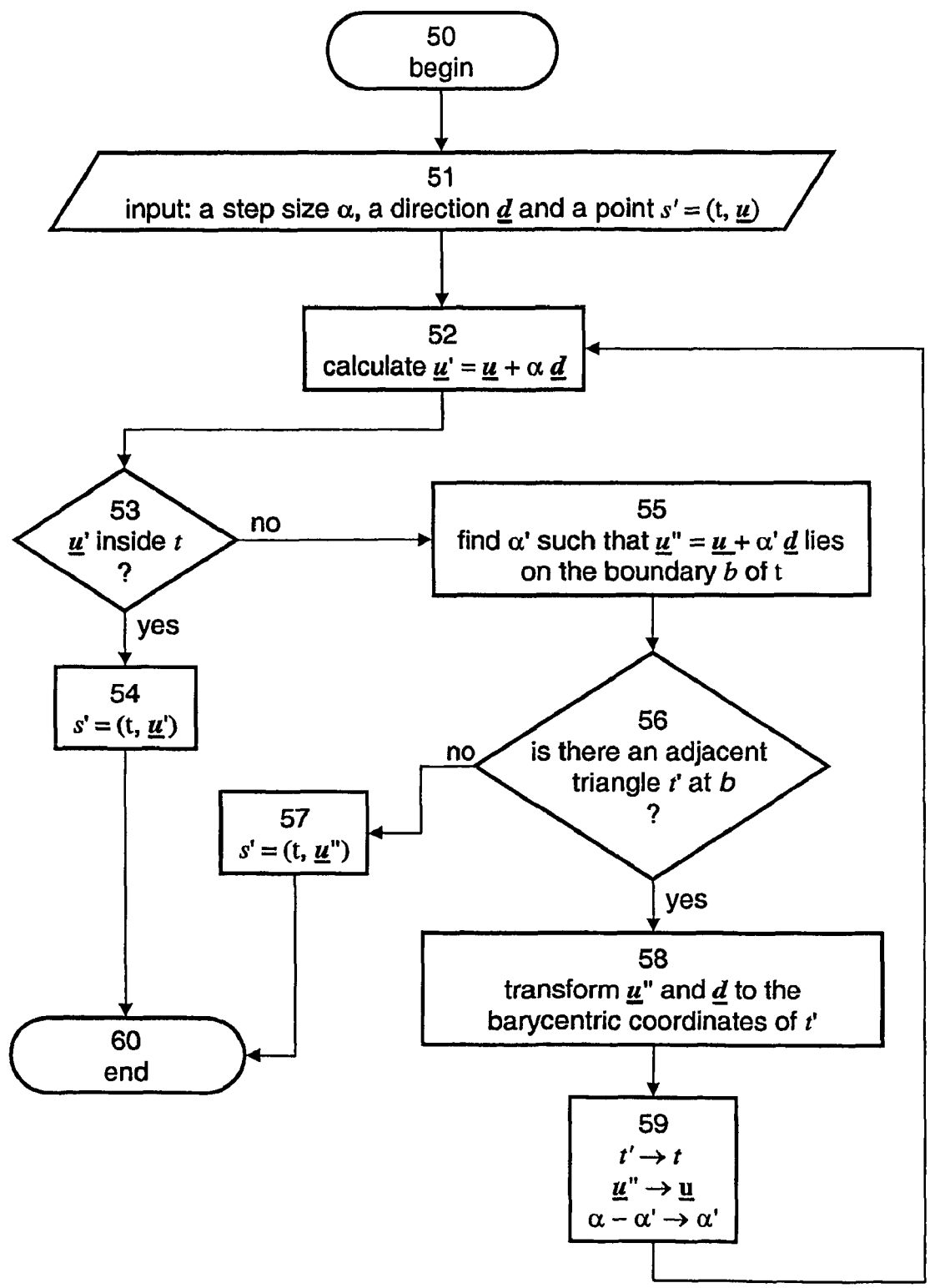
Figure 9A:
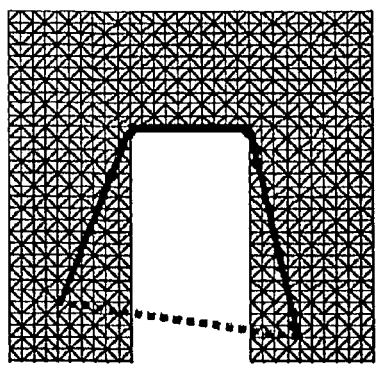
Figure 9B:
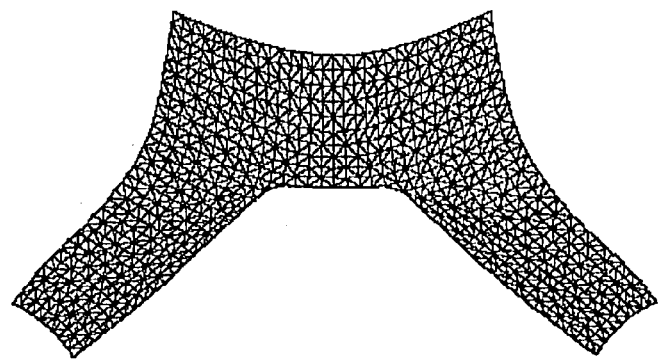

FIGS. 3a-b show a model surface (FIG. 3a) for which sufficient geometrical information is given, and a probe surface (FIG. 3b) for which the known geometrical information is only partial;

FIGS. 4a-b show a model surface (FIG. 4a) and probe surface (FIG. 4b), where there is sufficient geometrical information for both the model surface and the probe surface;

FIGS. 5a-c are schematic illustrations of a propagation procedure, according to various exemplary embodiments of the present invention;

FIG. 6 is a flowchart diagram of an algorithm for traversing a triangulated manifold, according to various exemplary embodiments of the present invention;

FIGS. 7a-d show example of data hierarchy construction for multiresolution optimization, according to various exemplary embodiments of the present invention;

FIGS. 8a-b are schematic illustrations of a procedure for finding a virtual "source" point characterized by predetermined distances from triangle vertices according to various exemplary embodiments of the present invention;

FIGS. 9a-b are schematic illustrations of partial embeddings of a planar patch into a plane, according to various exemplary embodiments of the present invention.

Figure 10A:
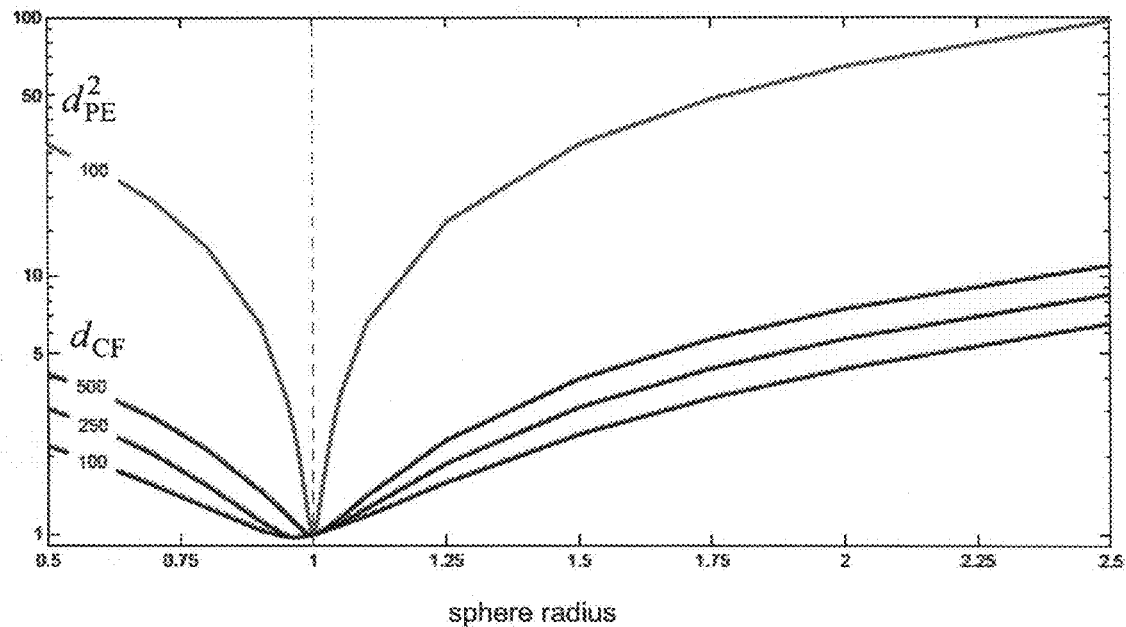
Figure 10B:
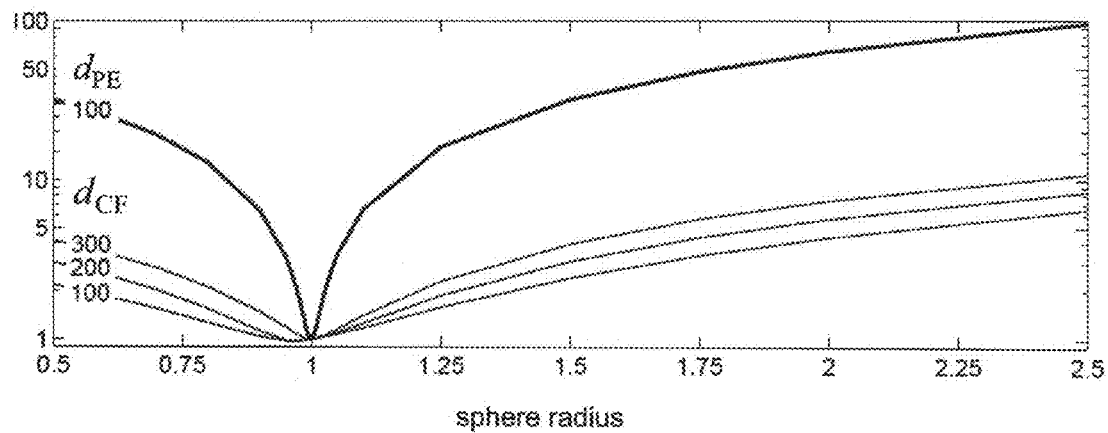
Figure 11A:
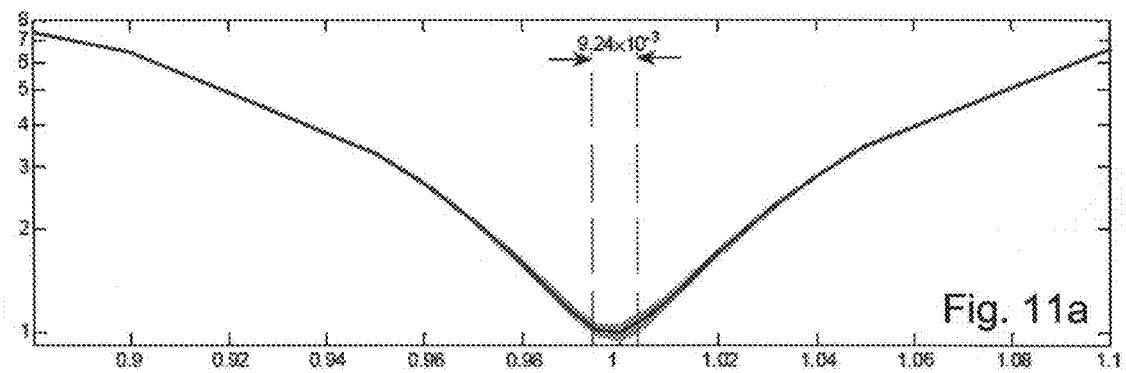
Figure 11B:
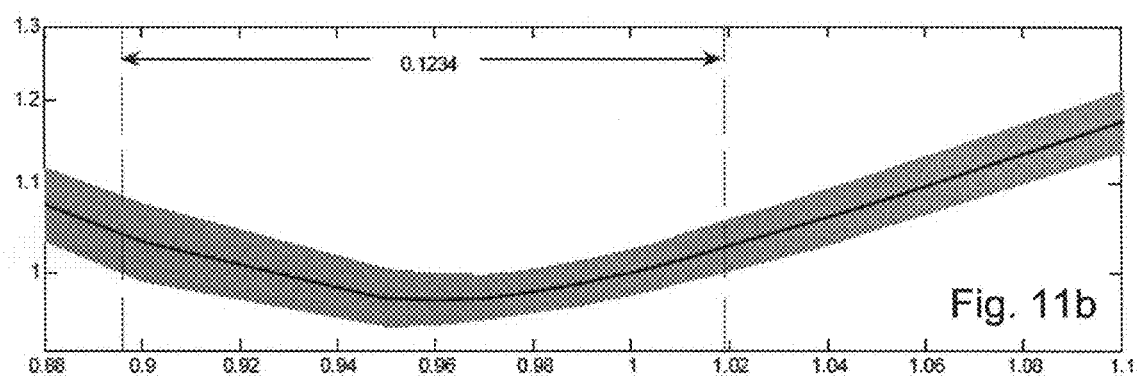
Figure 11C:
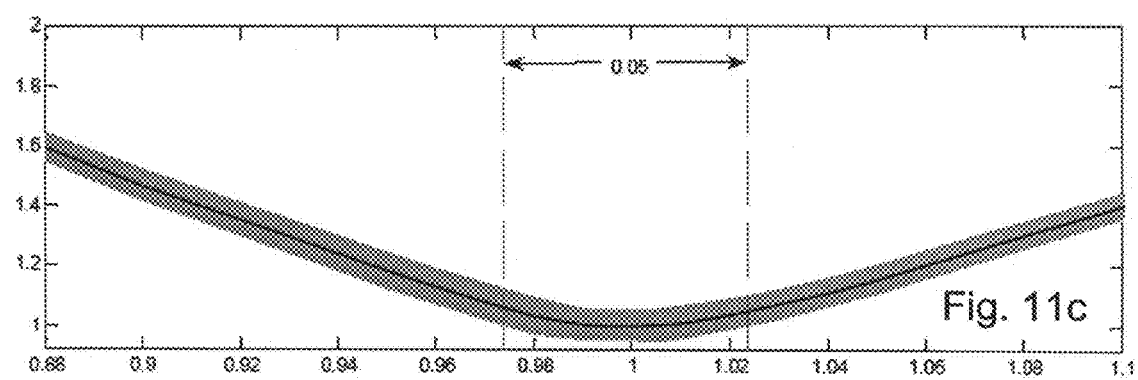
Figure 12A:
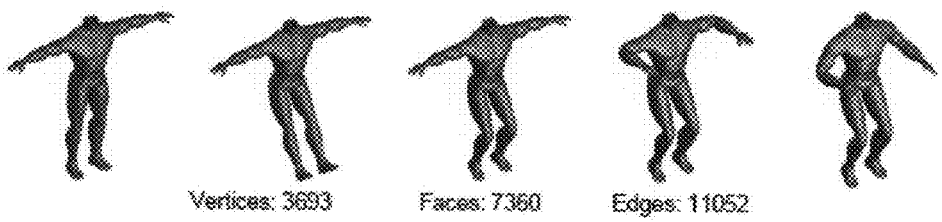
Figure 12B:
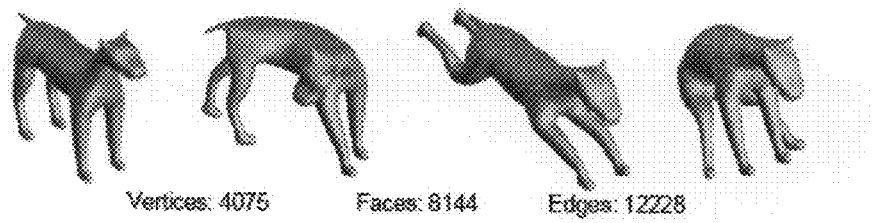
Figure 12C:
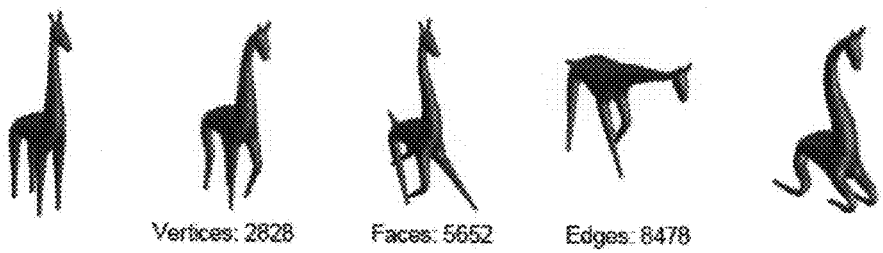
Figure 12D:
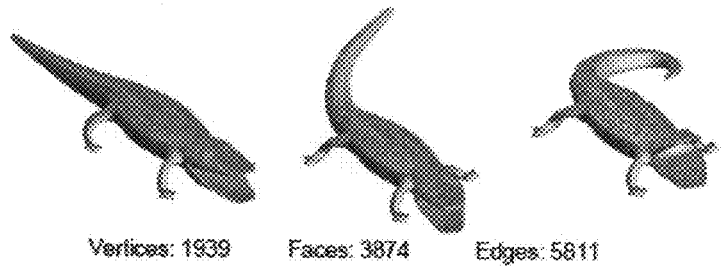
Figure 12E:
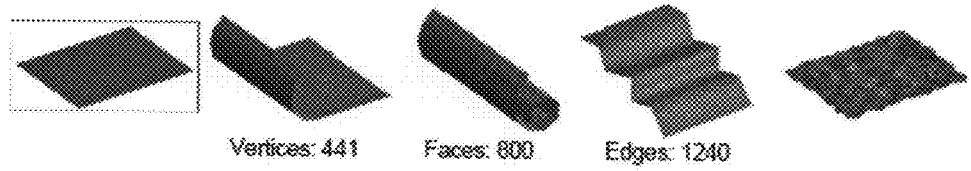
Figure 12F:
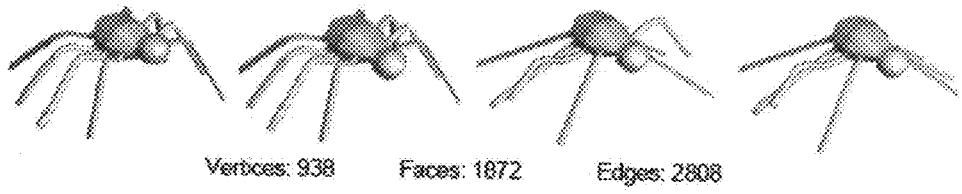

FIGS. 10a-b shows normalized distance between a densely sampled unit sphere and spheres of different radii calculated according to a preferred embodiment of the present invention (top line), and using canonical form distances (bottom lines);

FIGS. 11a-c show the normalized distances for radii in the range of 0.88 to 1.1, calculated according to a preferred embodiment of the present invention with 50 points (FIG. 11a), and using the canonical form distances with 100 (FIG. 11b) and 500 (FIG. 11a) points.

Figure 13A:
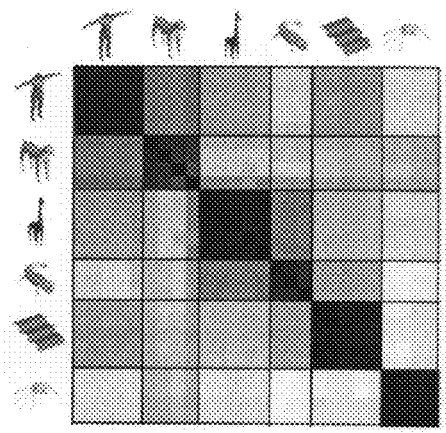
Figure 13B:
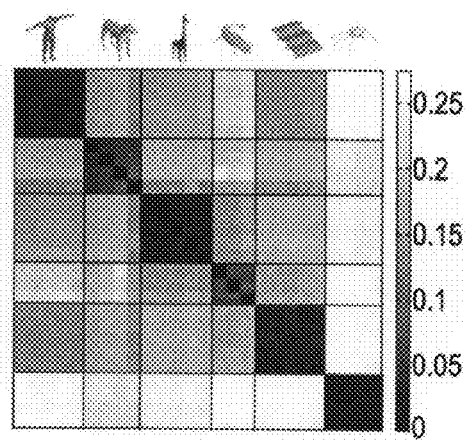
Figure 13C:
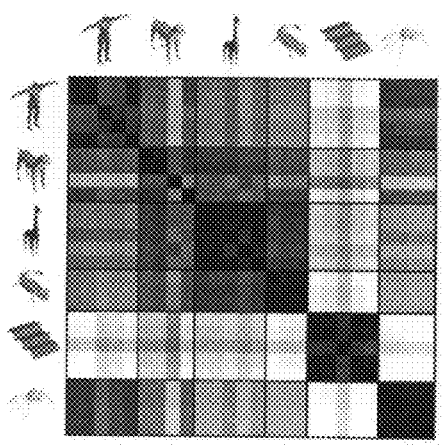
Figure 13D:
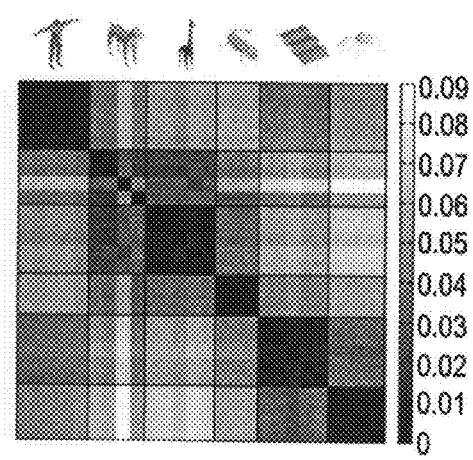
Figure 14A:
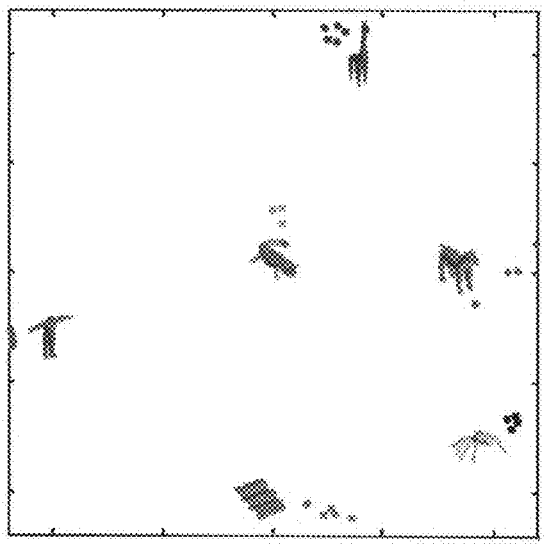
Figure 14B:
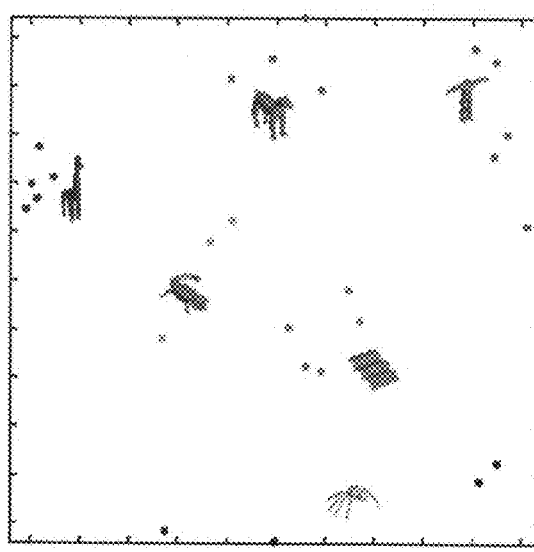
Figure 14C:
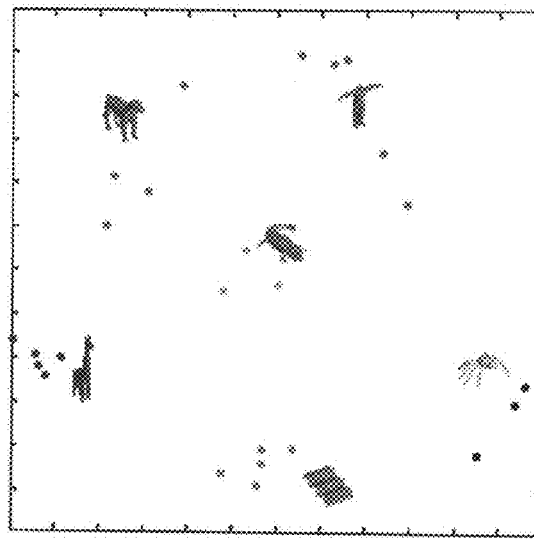
Figures 15A, 15B, 15C:
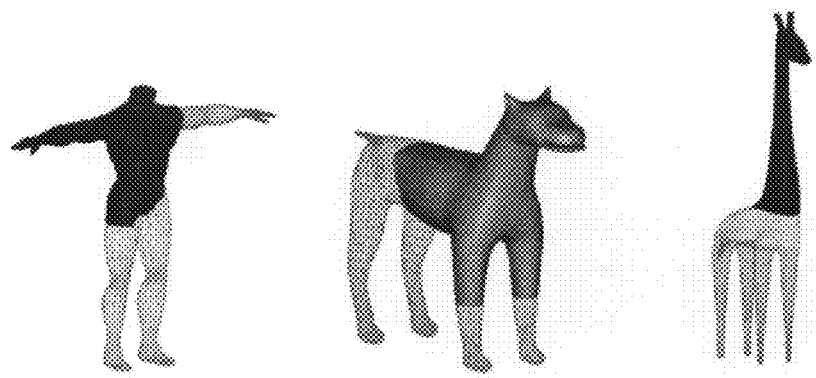
Figures 15D, 15E, 15F:
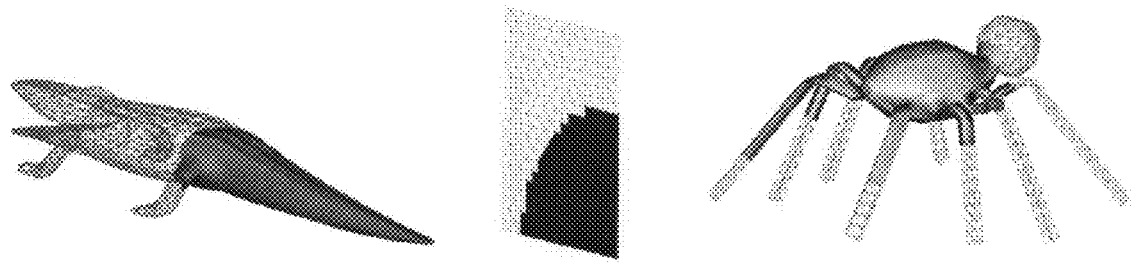
Figures 16A, 16B, 16C, 16D:
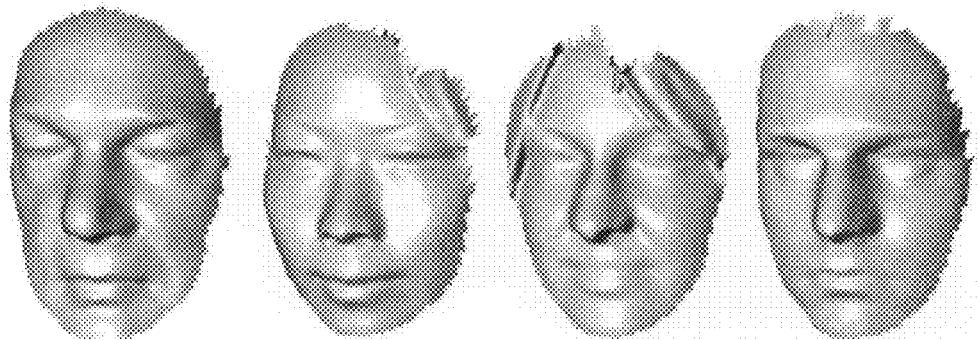
Figure 17A:
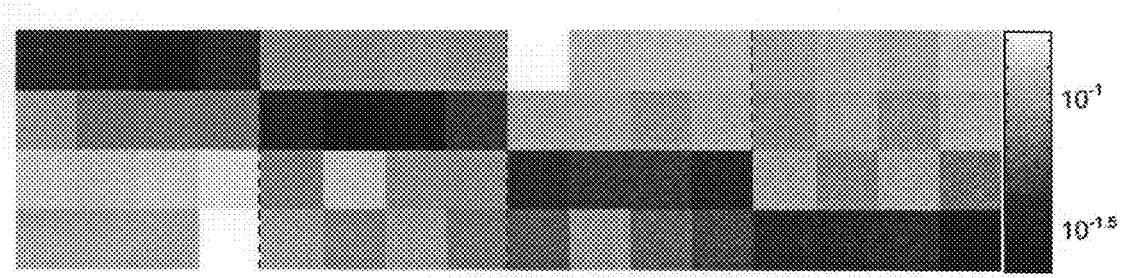
Figure 17B:
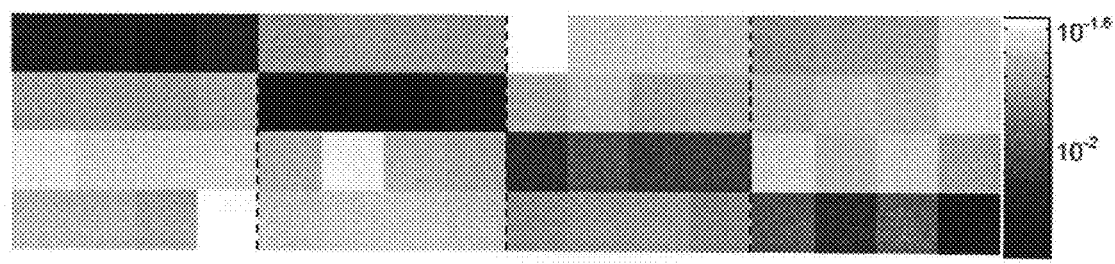
Figure 18A:
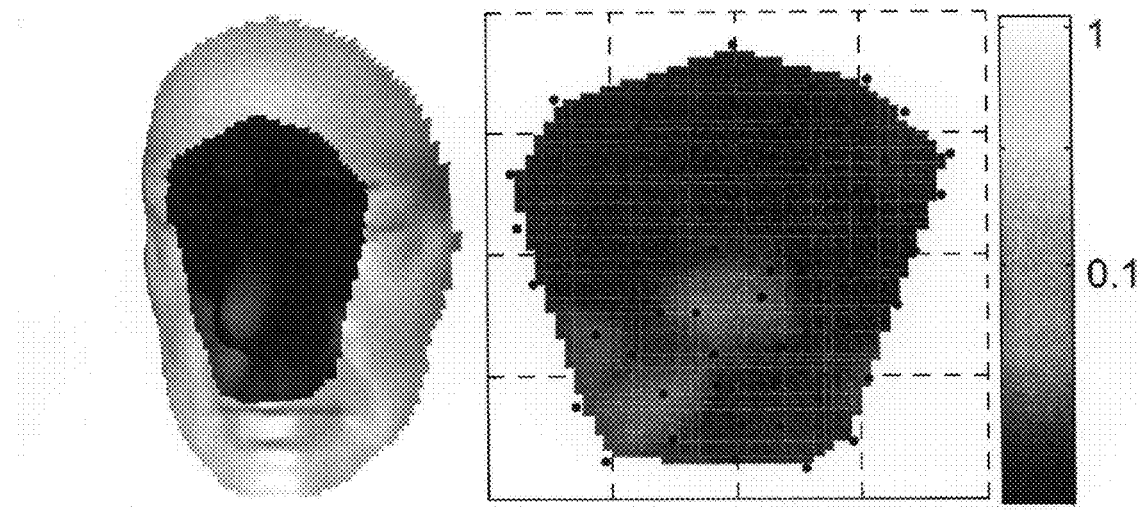
Figure 18B:
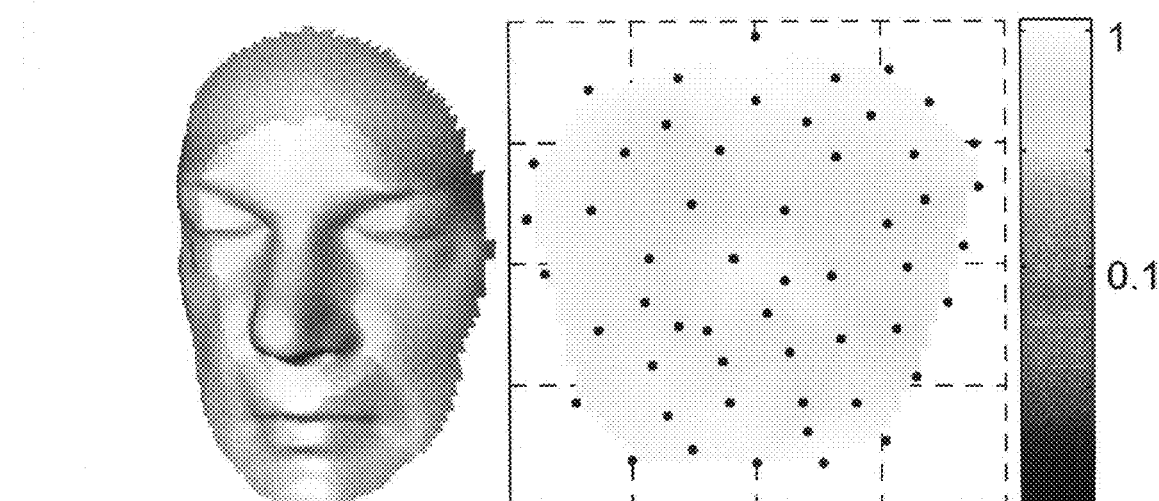

FIGS. 12a-f are schematic illustrations of six articulated objects and approximate isometries used according to embodiments of the present invention were applied for determining similarity;

FIGS. 13a-d show dissimilarity matrices obtained using embodiments of the present invention (FIGS. 13a-b) and using canonical form distances (FIGS. 13c-d);

FIGS. 14a-c show proximity pattern representing the dissimilarity matrices of FIGS. 13a, 13c and 13d, respectively;

FIGS. 15a-f are schematic illustrations of six probe surfaces with partial geometrical information, used according to embodiments of the present invention for determining similarity to the articulated objects of FIGS. 12a-f;

FIGS. 16a-d show model facial surfaces used according to embodiments of the present invention in a face recognition experiment;

FIGS. 17a-b show similarity matrices obtained using embodiments of the present invention for model facial surfaces in the face recognition experiment; and FIGS. 18a-b show local maps of objective function describing embeddings of probe facial surfaces of two different subjects into a model surface, according to embodiments of the present invention.

DESCRIPTION OF THE PREFERRED EMBODIMENTS

The present embodiments comprise a method and apparatus which can be used for determining similarity between surfaces. Specifically, but not exclusively, the present embodiments can be used for matching a probe surface to a model surface. For example, the present embodiments can be used for searching a library of model surfaces for a model surface which at least partially matches a probe surface.

The principles and operation of a method and apparatus according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Surface matching techniques which are based on embeddings a surface into an embedding space of high dimensionality introduce metric distortions which increase the matching error. For example, in U.S. Pat. No. 6,947,579, the surfaces to be matched are first embedded into a Euclidean space of three or more dimensions to produce bending-invariant canonical forms, and, subsequently, high-dimensional moments are used to compare between the bending-invariant canonical forms. Similar procedures have also been employed by replacing the Euclidean space with a non-flat space with a constant sectional curvature (e.g., a spherical or hyperbolic space) for which the geodesic distances are expressed analytically. However, in these techniques, the errors arising from the embedding step limit the distinguishing capability of the comparison. Such errors are inevitable and typically cannot be neglected because, generally, the surfaces of interest have intricate geometry which cannot be isometrically embedded into a space with a zero or another constant sectional curvature.

While conceiving the present invention it has been hypothesized and while reducing the present invention to practice it has been realized that similarity between non-planar surfaces can be determined by embedding at least one of the surfaces into an embedding space having a non-constant sectional curvature.

The term "non-planar surface" is typically known as a metric space $(S, d_S)$ induced by a smooth connected and compact Riemannian 2-manifold S, characterized by a geodesic distance function $d_S(s_a, s_b)$ between every two points $s_a$ and $s_b$ on S. The value of $d_S(s_a, s_b)$ is the length of the minimal geodesic of S which passes through the points $s_a$ and $s_b$.

It is recognized, however, that practically only a sampled version of the surface in known. Such a sampled surface is represented by a point-cloud which is a set of points $s_j$ (j=1, . . . , N), on the Riemannian 2-manifold, and which is sufficient for describing the topology of the manifold. Being represented as a discrete set of points, the sampled version of the surface is characterized by a discrete set of geodesic distances, rather than by a continuous function. Such a discrete set of geodesic distances is conveniently described by an N×N matrix $D_S = (d_S(s_i, s_j))$.

Thus, unless explicitly stated, the term "non-planar surface" refers herein to a sampled surface represented by an appropriate point-cloud. The term "surface" is used herein as an abbreviation of the term "non-planar surface".

The term "sectional curvature" is known in the art and refers to a mathematical object which controls the rate of geodesic deviation. The sectional curvature determines the Riemannian curvature tensor $R_{\mu\nu\rho\sigma}$. For example, for two-dimensional spaces, the sectional curvature K is related to $R_{\mu\nu\rho\sigma}$ via $R_{\mu\nu\rho\sigma} = K(g_{\mu\rho}g_{\sigma\nu} - g_{\mu\sigma}g_{\rho\nu})$, where $g_{\mu\nu}$ is the metric tensor of the space.

Figure 1:
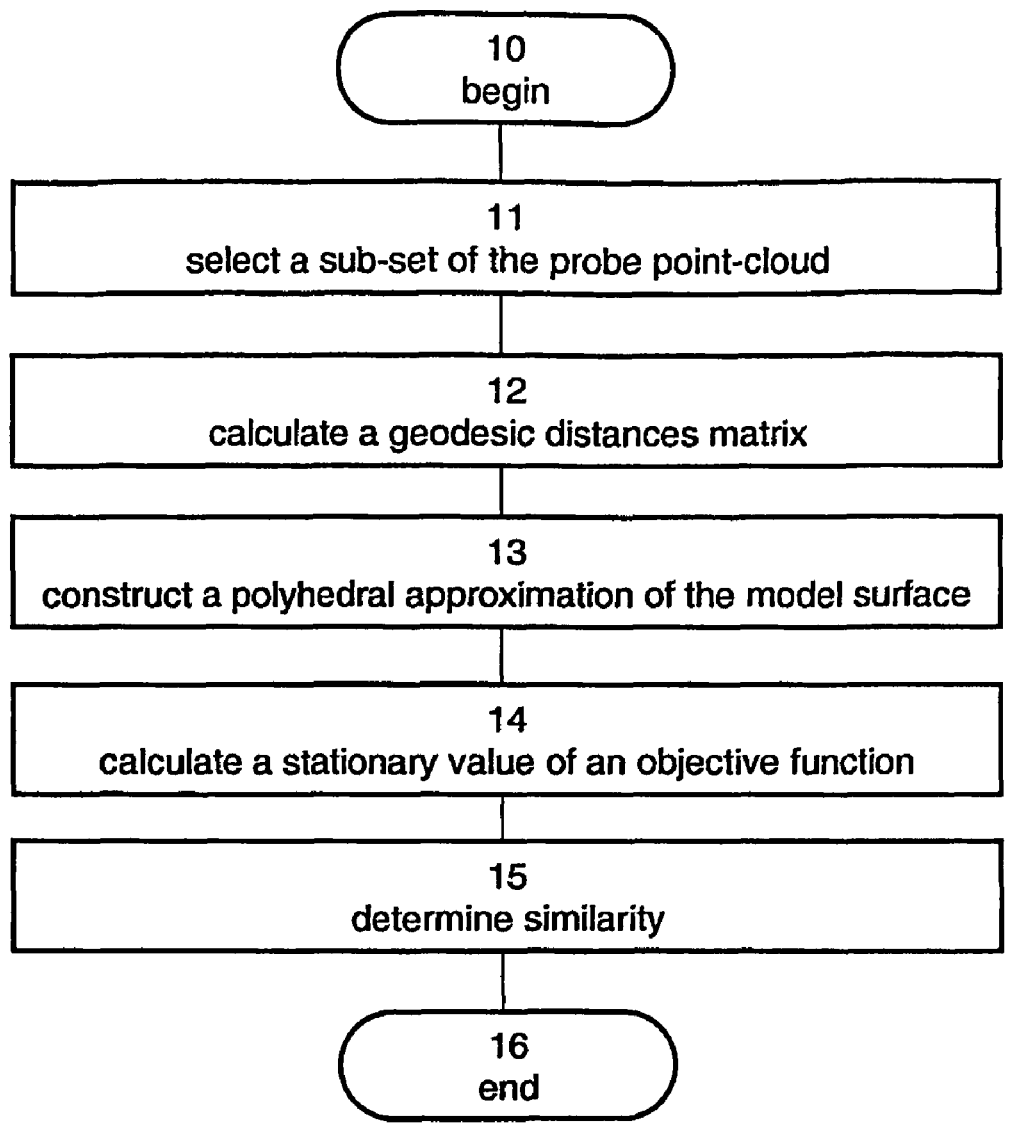

Referring now to the drawings, FIG. 1 is a flowchart diagram of a method suitable for determining similarity between surfaces, according to various exemplary embodiments of the present invention.

It is to be understood that, unless otherwise defined, the method steps described hereinbelow can be executed either contemporaneously or sequentially in many combinations or orders of execution. Specifically, the ordering of the flowchart diagrams is not to be considered as limiting. For example, two or more method steps, appearing in the following description or in the flowchart diagrams in a particular order, can be executed in a different order (e.g., a reverse order) or substantially contemporaneously. Additionally, several method steps described below are optional and may not be executed.

In various exemplary embodiments of the invention the method determines the method determines similarity between a reference surface, referred to herein as the model surface S, and another surface referred to herein as the probe surface Q. The method quantifies the similarity between the surfaces, typically by assigning a similarity measure $\epsilon(S, Q)$ to the pair of surfaces S and Q, so as to allow determining, for example, whether or not Q is a deformed version of S. The method of the present embodiments is particularly useful in face recognition applications, in which case both S and Q are facial surfaces. In these embodiments, the method can determine, for example, whether or not the two facial surfaces S and Q represent two different expressions or posing angles of the same person. Thus, low values of $\epsilon$ can correspond to a situation in which the facial surfaces S and Q represent the same face, while high values of $\epsilon$ can correspond to a situation in which the facial surfaces S and Q represent different faces. When there is more than one model surface, as, for example, in the case of a library of facial surfaces, the method can be executed a plurality of times, where in each execution the method determines similarity between Q and a different facial surface of the library.

As stated, non-planar surfaces of the present embodiments are represented by point-clouds. The point-cloud representing the model surface is a set of N points $s_j$ (j=1, . . . , N) which is referred to herein as the model point-cloud, and point-cloud representing the probe surface is a set of M points $q_j$ (j=1, . . . , M) which is referred to herein as the probe point-cloud. The dimensions N and M of the model and probe point-cloud, respectively, can be equal or different. As demonstrated in the Examples section that follows, the method of the present embodiments is capable of determining similarity between non-planar surfaces even when the number of points in the point cloud is relatively small, e.g., less than 200 points, more preferably less than 100 points, say about 50 points.

The method begins at step 10 and, optionally and preferably continues to step 11, in which a subset of the probe point-cloud is selected. The subset corresponds to a predetermined patch $Q' \subset Q$ of the probe surface. This embodiment is useful when it is desired to determine similarity between the patch $Q'$ and the model surface S. The selection of subset can be according to any criterion or set of criteria. For example, in various exemplary embodiments of the invention the subset includes only points for which the metric on $Q'$ (expressed by a proper matrix of geodesic distances) is consistent with the metric on Q. A preferred technique for selecting the subset is provided hereinunder. In the embodiments in which step 11 is employed, the probe point-cloud is preferably redefined to include only the points of the subset.

According to a preferred embodiment of the present invention the method continues to step 12 in which a matrix $D_Q = (d_Q(q_i, q_j))$ of geodesic distances $d_Q$ corresponding to the probe point-cloud is calculated. Typically, the matrix $D_S$, which corresponds to the model point-cloud, is already known. In the event in which $D_S$ is not known, step 12 preferably comprises the calculation of $D_S = (d_S(s_i, s_j))$. The calculation of geodesic distance matrices is well known in the art. In various exemplary embodiments of the invention the calculation of $D_S$ and/or $D_Q$ is performed using the fast marching method (FMM), found, e.g., in J. A. Sethian, "A fast marching level set method for monotonically advancing fronts," Proc. Nat. Acad. Sci., 1996, 93(4): 1591-1595; and R. Kimmel and J. A. Sethian "Computing geodesic on manifolds," Proc. US National Academy of Science, 1998, 95:8431-8435, the contents of which are hereby incorporated by reference. FMM is an efficient numerical method to compute a first-order approximation of the geodesic distances. Given a set of points $\{q_j\}$ on Q a distance map $T(x, y)$ from these points to other points on the surface is obtained as the solution of an Eikonal equation, $\|\nabla\|=1$; $T(q_j)=0$. The FMM allows computing of the distance map with an $O(M \log M)$ complexity. A similar technique can be applied for the set $\{s_j\}$ of S with complexity of $O(N \log N)$.

The method continues to step 14 in which an extremal value (a minimum or a maximum) of an objective function F is calculated. The objective function F preferably describes the embedding of the probe surface Q (or a patch thereof, Q') into an embedding space, which preferably has a non-constant sectional curvature. In other words, the present embodiments contemplate any embedding space other than a spherical, hyperbolic and Euclidian space. According to a preferred embodiment of the present invention the embedding space is a two-dimensional space, i.e., the dimensionality of the embedding space is preferably the same as the dimensionality of the probe surface Q. As will be appreciated by one of ordinary skill in the art, this corresponds to a zero co-dimension of Q in the embedding space. This is in sharp distinction to other surface matching techniques in which the co-dimension of the probe surface in the embedding space is at least 1 and oftentimes 2 or more.

In various exemplary embodiments of the invention the embedding space is a polyhedral approximation of the model surface S. Thus, the embedding space can be a triangulated manifold, a quadrangulated manifold or it can be expressed using any other polygonal representation. For example, when the embedding space is a triangulated manifold, it is associated with a triangulation set $T_S$, defined as $T_S = \{(m_{11}, m_{12}, m_{13}), \ldots, (m_{N_T}, 1, m_{N_T}, 2, m_{N_T}, 3)\}$, such that the model point-cloud S is approximated as a polyhedron consisting of $N_T$ triangular faces, where the t-th face is described by the vertices $s_{m_{t1}}, s_{m_{t2}}, s_{m_{t3}}$. Typically, such or similar polyhedral approximation of the model surface S is already provided before the method is executed. In other embodiments, e.g., when only a point-cloud of S is known, step 14 is preceded by step 13 in which a polyhedral approximation is constructed from the model point-cloud. This can be done in any technique known in the art, such as, but not limited to, a region-growing algorithm, e.g., a ball-pivoting algorithm or the like.

Many types of objection functions are contemplated. Generally, the objective function F is selected so as to allow the determination of the similarity between Q and S. Typically, F is selected such that its extremal (e.g., minimal) value can serve as a similarity measure $\epsilon$. For example, when the embedding space is a polyhedral approximation of the model surface, F can selected such that:

$$\epsilon(S, Q) = \min F \qquad (EQ. 1)$$

where the minimization is performed over the arguments of the objective function F.

In various exemplary embodiments of the invention the arguments of the objective function is the set $\{s'_j\}$ ($j=1, \ldots, M$), where $s'_j$ satisfy $s'_j = \psi(q_j)$ and where $\psi: Q \rightarrow S$ is a mapping from Q to S. In other words, in these embodiments, the arguments of the objective function are images in the model surface of points from the probe point cloud. In other embodiments, the arguments of the objective function is the set $\{q'_i\}$ ($i=1, \ldots, N$), where $q'_j$ satisfy $q'_i = \phi(s_i)$ and where $\phi: S \rightarrow Q$ is a mapping from S to Q. Alternatively, the arguments of the objective function can be both sets $\{s'_j\}$ and $\{s'_j\}$.

In the embodiments in which the arguments are images, they do not necessarily coincide with points from the point-cloud. According to a preferred embodiment of the present invention the images are obtained by interpolating the respective point cloud. For example the $s_j$ do not necessarily coincide with points from the model point-cloud. Thus, when F is a function of $\{s'_j\}$, the images $s'_j$ are interpolated in the polyhedral approximation of S. For example, when a triangulated manifold is used, an image point s' can be identified using a vector of barycentric coordinates (t, u, where $t \in \{1, \ldots, N_T\}$ is an index identifying the triangle to which s' belongs, and $\bar{u} = (u_1, u_2, u_3)$ is a barycentric 3-vector satisfying $u_1 \geq 0$ and $\bar{u}_1 + u_2 + u_3 = 1$. The Euclidean displacement vector s' of the point s' is related to the barycentric 3-vector via $s' = (u_1 s'_{m_{t1}} + u_2 s_{m_{t2}} + u_3 s_{m_{t3}}$, where $s'_{m_{ti}}$ ($i=1, 2, 3$) are the vertices of triangle t.

The extremal value of F can be calculated using any numerical optimization procedure known in the art. Typically, an iterative procedure is employed. The numerical optimization procedure is preferably selected in accordance with the type of the selected objective function. For example, when the F comprises $l_2$-norms, the iterative procedure is preferably such that can efficiently locate extremal points of $l_2$-norm optimization problems. Representative examples of numerical optimization procedure suitable for the present embodiments include, without limitation, the fixed step gradient method, the conjugate gradient method, the biconjugate gradient method, the Newton method or any approximation thereof including the truncated Newton method, one of the variety of quasi-Newton methods, including BFGS and limited memory BFGS, the Chebyshev method, the minimal residual method and any combination thereof. Preferred expressions for the objective function F and preferred procedures for calculating the extremal value of F are provided hereinunder and exemplified in the Examples section that follows.

Once the extremal value of F is calculated, the method continues to step 15 in which the similarity between the surfaces is determined, based on the obtained extremal value. This can be done, e.g., by subjecting the extremal value to a thresholding procedure so as to determine whether or not the two surfaces are similar. Alternatively, the level of similarity between the surfaces can be determined, e.g., by assigning to the two surface a similarity measure $\epsilon$ as further detailed hereinabove.

The method ends at step 16.

Figure 2:
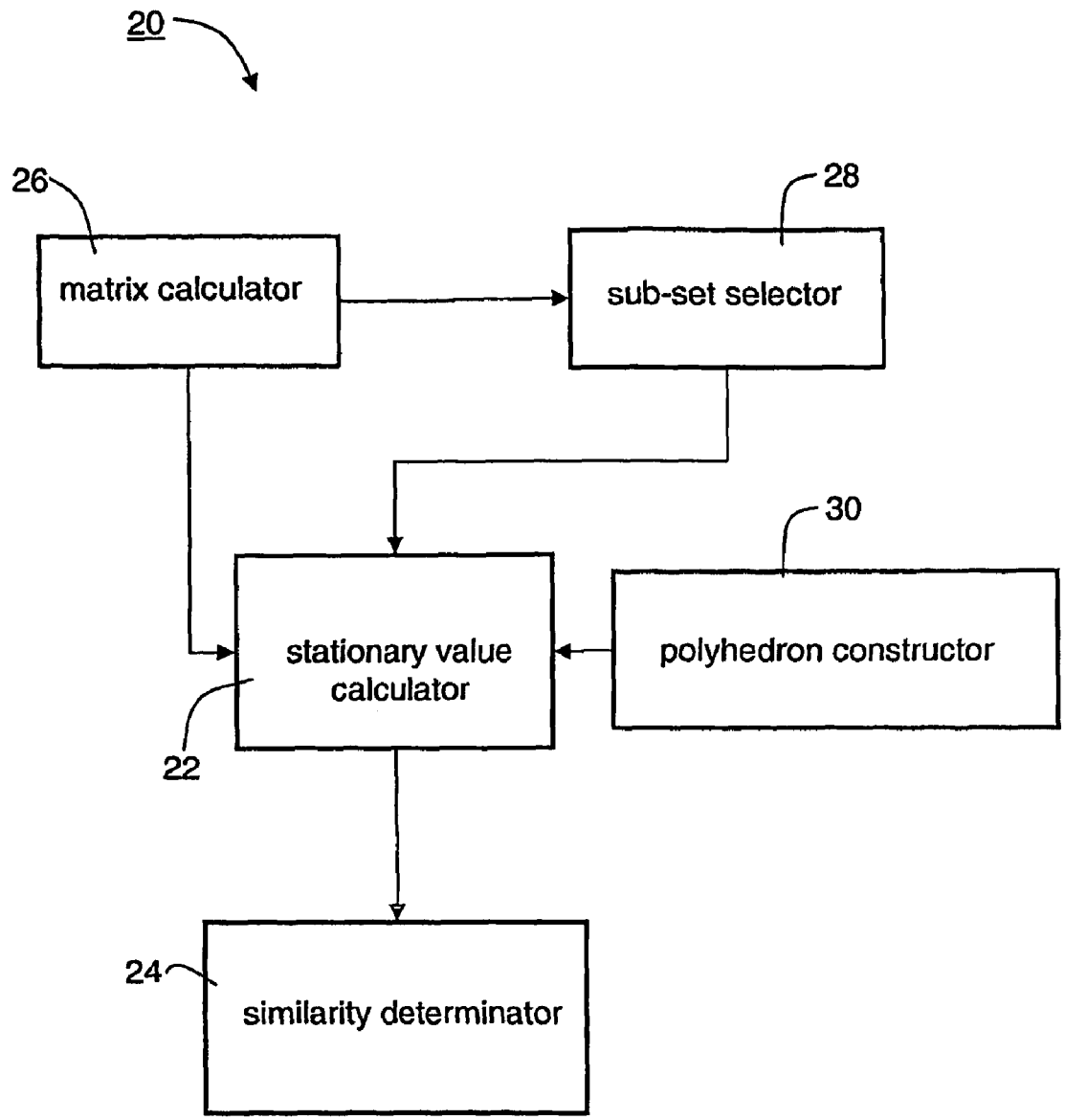

Reference is now made to FIG. 2 which is a schematic illustration of an apparatus 20 for determining similarity between probe surface Q and model surface S, according to various exemplary embodiments of the present invention. Apparatus 20 preferably designed and configured for executing selected steps of the method described herein. Apparatus 20 comprises a extremal value calculator 22, which calculates the extremal value of the objective function F as explained hereinabove and further detailed hereinunder. Apparatus 20 further comprises a similarity determinator 24 which, based on extremal value, determines the similarity between the surfaces Q and S, as further detailed hereinabove. According to a preferred embodiment of the present invention apparatus 20 further comprises a matrix calculator 26 for calculating the matrix $D_Q$ and optionally the matrix $D_S$, as further detailed hereinabove. Apparatus 20 can also comprise a subset selector 28 which selects a subset of the probe point-cloud corresponding to the predetermined patch Q', as further detailed hereinabove. Subset selector 28 preferably communicates with extremal value calculator 22 such that the subset selected by selector 28 is used for calculating the extremal value of F. Preferably, apparatus 20 further comprises a polyhedron constructor 30 which constructs a polyhedral approximation from the model point-cloud and feeds extremal value calculator 22 with the polyhedral approximation. Calculator 22 uses the polyhedral approximation as the embedding space as further detailed hereinabove.

Following is a description of several types of objective functions, according to various exemplary embodiments of the present invention.

As stated, F is typically selected such that its extremal value can serve as a similarity measure $\epsilon$. Thus, in one embodiment, the objective function is selected such that $\epsilon$ is a partial embedding distance $d_{PE}(S, Q)$ between the probe surface Q (or a patch Q' thereof) and the model surface S. The partial embedding distance can be defined as:

$$d_{PE}(S, Q') \equiv \frac{1}{2} \inf_{\psi: Q \to S} \sup_{(q,q') \in P} |d_Q(q, q') - d_S(\psi(q), \psi(q'))|, \quad (EQ. 2)$$

where $P \subset Q \times Q$ is defined the set of all pairs of points for which the metric on the patch Q' is consistent with the metric on Q, $P = \{(q,q'): d_{Q'}(q,q') = d_Q(q,q')\}$.

The selection $\epsilon = d_{PE}$ is particularly useful in situations in which one or both surfaces are given only partially. Such situation is illustrated in FIGS. 3a-b. Shown in FIGS. 3a-b is a model surface S (FIG. 3a) for which sufficient geometrical information is given, and a probe surface Q (FIG. 3b) for which the known geometrical information is only partial. It was found by the present Inventors of the present invention that $\epsilon = d_{PE}$ is also suitable for the case in which sufficient geometrical information is given for both surfaces. Such situation is illustrated in FIGS. 4a-b, showing sufficient geometrical information for both the model surface S (FIG. 4a) and the probe surface Q (FIG. 4b). In this embodiment, $P = Q \times Q$, and Equation 2 reduces to:

$$d_{PE}(S, Q) = \frac{1}{2} \inf_{\psi: Q \to S} \mathrm{dis}\psi, \quad (EQ. 3)$$

where dis $\psi$, defined as dis $\psi = \sup_{q,q' \in Q} |d_Q(q,q') - d_S(\psi(q), \psi(q'))|$. As will can be understood from the above definition, dis $\psi$ measures the distortion of the mapping $\psi$ from Q to S. If, for example, dis $\psi = 0$, the mapping $\psi$ is an isometry and the surfaces S and Q are isometric. A preferred expression for the objective function in the embodiment in which $\epsilon = d_{PE}$ is provided hereinunder.

In another embodiment, the objective function is selected such that $\epsilon$ is a Gromov-Hausdorff distance $d_{GH}(S, Q)$ between Q and S. For bounded metric spaces, the Gromov-Hausdorff distance can be written as [N. J. Kalton and M. I. Ostrovskii, "Distances between Banach spaces," Forum Math, 1999, 11(1):17-48; F. Mémoli and G. Sapiro, "A Theoretical and Computational Framework for Isometry Invariant Recognition of Point Cloud Data," Foundations of Computational Mathematics, 2005, 5(3):313-347]:

$$d_{GH}(S, Q) \equiv \frac{1}{2} \inf_{\substack{\psi: Q \to S \\ \varphi: S \to Q}} \max\{\mathrm{dis}\varphi, \mathrm{dis}\psi, \mathrm{dis}(\varphi, \psi)\}, \quad (EQ. 4)$$

where the distortion measure dis $(\phi, \psi)$ characterizes the difference between $\phi$ and $\psi^{-1}$, or between $\psi$ and $\phi^{-1}$. dis $(\phi, \psi)$ can be defined as:

$$\mathrm{dis}(\varphi, \psi) \equiv \sup_{\substack{s \in S \\ q \in Q}} |d_S(s, \psi(q)) - d_Q(q, \varphi(s))|. \quad (EQ. 5)$$

The selection $\epsilon(S, Q) = d_{GH}(S, Q)$ is particularly useful in situations in which sufficient geometrical information is given for both surfaces (e.g., the situation in FIGS. 4a-b). A preferred expression for the objective function in the embodiment in which $\epsilon = d_{GH}$ is provided hereinunder.

It is to be understood that similarity measures other than $\epsilon = d_{PE}$ and $\epsilon = d_{GH}$ are not excluded from the scope of the present invention.

As will be appreciated by one ordinarily skilled in the art, Equation 1 above describes a minimization problem in which the images $s'_j = \psi(q_j)$ serve as optimization variables. This is advantageous because there is no need to optimize over all possible permutations of $s_j$ and $q_j$.

In various exemplary embodiments of the invention the objective function F comprises a sum of local distortions, where at least a few of the local distortions characterize the embedding of a pair of points in Q into the embedding space. Preferably, but not obligatorily, the sum is a weighted sum. A local distortion is a local function of a difference between two geodesic distances. Thus, unlike the distortions dis $\psi$, dis $\phi$ and dis$(\phi,\psi)$, in which a supremum is taken on the respective set(s) so as to globally characterize the mappings from one surface to the other, the local distortion is defined to characterize mapping of a specific geodesic path. More specifically, a local distortion is a local function of the difference between a first geodesic distance defined in the probe surface and a corresponding second geodesic distance defined in the embedding space. For example, when the embedding space is an approximation of S, the local distortion is preferably defined as $\eta(d_S-d_Q)$, where $\eta$ is preferably a non-linear function (e.g., the selection $\eta(x)=x^2$ correspond to the $l_2$ norm and the selection $\eta(x)=|x|$ corresponds to the $l_1$ norm), and $d_S$ and $d_Q$ are geodesic distances between pair of points in S and Q, respectively.

A preferred expression for the objective function F in the embodiment in which $\epsilon=d_{PE}$ is:

$$F(s'_1, \ldots, s'_M) = \sum_{i,j} w_{ij}\eta(d_S(s'_i, s'_j) - d_Q(q_i, q_j)), \quad \text{(EQ. 6)}$$

where $w_{ij}$ are the weights of the sum over i and j. When F is expressed as a non-weighted sum, $w_{ij}=1\,\forall i,j$. The weights can be set so as to select the subset which corresponds to the patch $Q' \subset Q$. Specifically, $w_{ij}$ can be selected such that $w_{ij}=1$ for $(q_i, q_j)$ in the subset, and 0 otherwise. According to the aforementioned notations, $(q_i, q_j)$ is a pair of points in the point-cloud of Q, while $(s'_i, s'_j)=(\psi(q_i), \psi(q_j))$ are the images of $(q_i, q_j)$ as mapped to S.

A preferred expression for the objective function F in the embodiment in which $\epsilon=d_{GH}$ is:

$$F(s'_1, \ldots, s'_M; q'_1, \ldots, q'_N) = \sum_{i,j=1}^{N} \eta(d_Q(q'_i, q'_j) - d_S(s_i, s_j)) + \sum_{k,l=1}^{M} \eta(d_S(s'_k, s'_l) - d_Q(q_k, q_l)) + \sum_{i,k} \eta(d_S(s_i, s'_k) - d_Q(q_k, q'_i)), \quad \text{(EQ. 7)}$$

where i,j=1, 2, ..., N are model point-cloud indices, k,l=1, 2, ..., M are probe point-cloud indices, and $q'_i$, $q'_j$ are images in the probe surface of points of the model point-cloud, e.g., $q'_j = \phi(s_j)$. The images $q'_i$, $q'_j$ are preferably interpolated in a similar way to the images $s'_k$ and $s'_l$, e.g., by identifying image points using vectors of barycentric coordinates, as further detailed hereinabove.

Equation 1, with the expressions of Equations 2 or 3 for the objective function F, can be viewed as a minimization problem with in a finite norm $l_p$, where $1 \le p \le \infty$. It is to be understood, however, that although practical considerations may favor the choice of finite norms, it is not intended to limit the scope of the present invention to finite norm representations. Thus, Equation 1 can also be written as a minimization of maximum distortion in an infinite norm ($l_\infty$) representation. For example, when $\epsilon=d_{PE}$, F can be defined as $$F = \max_{i,j=1, \ldots M} w_{ij}|d_S(s'_i, s'_j) - d_Q(q_i, q_j)|.$$

With such selection for F, Equation 1 becomes the following min-max $l_\infty$-norm constrained problem:

$$\min_{s'_i, \varepsilon \ge 0} \varepsilon \quad \text{s.t.} \quad |d_S(s'_i, s'_j) - d_Q(q_i, q_j)| \le \varepsilon, \quad \text{(EQ. 8)}$$

with M+1 variables and at most M(M-1)/2 inequality constraints.

Similarly, for $\epsilon=d_{GH}$, another objective function can be defined such that the following min-max $l_\infty$-norm constrained problem is obtained:

$$\min_{s'_l, q'_k, \varepsilon \ge 0} \varepsilon \quad \text{s.t.} \quad \begin{aligned} &|d_Q(q'_i, q'_j) - d_S(S_i, S_j)| \le \varepsilon \\ &|d_S(s'_k, s'_l) - d_Q(q_k, q_l)| \le \varepsilon \\ &|d_S(s_i, s'_k) - d_Q(q_k, q'_i)| \le \varepsilon, \end{aligned} \quad \text{(EQ. 9)}$$

where j>i and l>k. Equations 9 have M+N+1 variables and at most $0.5(M^2+N^2+MN-M-N)$ inequality constraints.

As stated, the extremal value of the objective function F can be calculated by an iterative procedure. Thus, starting with some initial values of the optimization variables of F, the method proceeds by iteratively updating their locations on S so as produce a decreasing sequence of function values. Following is a description of a preferred iterative procedure in the embodiment in which the objective function has the form of Equation 6, where the optimization variables are the image points $s'_j$, j=1, ..., M. One of ordinary skills in the art, provided with the details described herein would know how to adjust the procedure for other types of objective functions, e.g., the expression of Equation 7. When it is desired to solve the constrained problems (e.g., Equations 8 or 9), the problem is first de-constrained, for example, by employing a penalty-barrier method [D. Bertsekas, "Nonlinear programming," published by Atlanta Scientific]. Once an unconstrained problem is provided it can be solved similarly to the way described below.

Let $s'_i{}^{(k)}=(t_i{}^{(k)}, u_i{}^{(k)})$ be the optimization variables at the k-th iteration. According to the presently preferred embodiment of the invention the method selects, at each iterative step, a set of directions $d_i{}^{(k)}$ and a step size $\alpha^{(k)}$ such that the displacement of $u_i{}^{(k)}$ along $d_i{}^{(k)}$ by $\alpha^{(k)}$ decreases the value of F. For clarity of presentation, the iteration index k will be omitted hereinafter. The directions $d_i$ can be selected using any method known in the art. Representative examples include, without limitation, the steepest decent method, the fixed step gradient method, the conjugate gradient method, the Newton method and any combination thereof. These methods are well known in the art and are found in many textbooks (to this end see, e.g., D. Bertsekas, supra).

The step size $\alpha$ is preferably a variable step size selected so as to ensure a sufficient decrease of the objective function. In various exemplary embodiments of the invention $\alpha$ is adaptively selected, at each iterative step. This can be done, for example, be a procedure known as "the Armijo rule". According to this procedure, beginning from an initial value $\alpha=\alpha_0$, $\alpha$ is successively reduced by a factor $\beta$ ($0<\beta<1$), until the following condition is fulfilled:

$$F(s'_1, \ldots, s'_M) - F(s''_1, \ldots, s''_M) \ge -\sigma\alpha \sum_i d_i^T \nabla_{u_i} F(s'_1, \ldots, s'_M), \quad \text{(EQ. 10)}$$

where $\sigma$ is a parameter satisfying $0<\sigma<1$, and $s''_i$ represent the points $s'_i$ displaced by $\alpha$ along $d_i$. Typical values for the parameters $\beta$ and $\sigma$ are, without limitation, about 0.3 for $\sigma$, and about 0.5 for $\beta$. The initial value $\alpha_0$ is selected sufficiently large (e.g., about one tenth of the diameter of the surface.

As used herein the term "about" refers to ±10%.

A similar rule can be applied when the update is performed for a single point per iteration, yielding a block-coordinate descent algorithm.

During the iterative procedure, the method preferably traverses the triangulated manifold while ensuring that the images $s'_i$ are always in a plane of one of the triangles. This can be achieved by following a poly-linear path on the triangulated manifold. Thus, a point $u_i$ on the manifold can be updated by propagating along a straight line in the direction $d_i$ until the first intersection with the triangle boundary and proceeding along a line inside the triangle adjacent to the intersected edge. This propagation procedure is continued until the total length of the path is $\alpha$. A representative example of such propagation procedure is illustrated in FIGS. 5a-c. In FIG. 5a, a point u is displaced along direction d in a triangle t=ABC until the edge BC of the triangle is reached. In FIG. 5b an adjacent triangle t'=BCD sharing edge BC with triangle t is rotated about BC and the direction vector d is transformed to the barycentric coordinates of triangle t' (d→d'). In FIG. 5c the final point u' is distant $\alpha$ from point u along a poly-linear path. Thus, the barycentric representation of the image points s' is preserved.

A preferred algorithm for traversing the manifold while preserving the barycentric representation is illustrated in the flowchart diagram of FIG. 6. The algorithm begins at step 50 and continues to step 51 in which a step size $\alpha$, a propagation direction d, and a point s'=(t, u) identified by a triangle t and barycentric vector u are inputted. The algorithm proceeds to step 52 in which a query barycentric vector u'=u+$\alpha$d is computed. The algorithm continues to decision step 53 in which it determines whether or not u' is inside triangle t. If u' is inside t, the algorithm continues to step 54 in which the query barycentric vector is accepted and s' is updated to a new point s'=(t, u') in t. From step 54 the algorithm continues to ending step 60. If u' is outside t, the algorithm continues to step 55 in which the algorithm finds a new step size $\alpha'$ for which the vector u"=u+$\alpha'$d lies on a boundary b of t. From step 56 the algorithm continues to an additional decision step in which the algorithm determines whether or not there exist a triangle adjacent to t at b. If there is no such adjacent triangle, the algorithm continues to step 57 in which s' is updated to a new point s'=(t, u") in t. From step 57 the algorithm continues to ending step 60. If there is a triangle t' adjacent to t at boundary b, the algorithm continues to step 58 in which u" and d are transformed to the barycentric coordinates of t'. Since u" is located on b which is shared by t and t', its transformation can readily be achieved using the same barycentric representation in t' up to vertex numbering. The transformation of d to the barycentric coordinates of t', is performed by rotating t' about b such that t and t' are coplanar, and finding a direction vector d' in the coordinate system of t', which defines the same planar direction as d in t. The transformation of d is completed with the replacement d'→d.

Since at each iteration the Armijo rule produces a decreasing sequence of step sizes, it is sufficient to compute the displacement of $s'^{(k)}_i$ by $\alpha_0 d_i$ and cache the entire path. As will be appreciated by one of ordinary skill in the art this allows to save path computations for subsequent smaller steps.

In various exemplary embodiments of the invention the calculation of extremal value comprises multiresolution optimization. The advantage of multiresolution optimization is that it can reduce or eliminate effects of convergence to a local extremum. An additional advantage of multiresolution optimization is a significant speedup of convergence.

Thus, according to a preferred embodiment of the present invention the optimization problem (e.g., minimization of F) is converted to a hierarchy of optimization problems. The initial optimization problem is a coarse version of the problem which contains a small number of variables (image points, in the above example). The coarse level solution is interpolated to the next resolution level, and is used as an initialization for the optimization at that level. The process is repeated until the desired resolution is obtained. Such a multiresolution optimization facilitates the initiation of the iteration, because small local extrema tend to disappear at coarse resolution levels, thus reducing the risk of local convergence.

The main components of the multiresolution scheme are the hierarchy of data which defines optimization problems at different resolution levels and the interpolation procedure, which allows to pass from coarse level to a finer one. Formally, let $Q_{M_1} \subset Q_{M_2} \subset \ldots \subset Q_{M_L} = Q_M$ be an L-level hierarchy of data. The points on the (l-1)st resolution level are obtained by removing part of the points on the l-th level. The corresponding distance matrices $D_1, \ldots, D_L = D_Q$ are created as sub-matrices of $D_Q$.

Such a hierarchy can be constructed, for example, is the farthest point sampling (FPS) strategy [Eldar et al., "The farthest point strategy for progressive image sampling", IEEE Trans. Image Processing, 1997, 6(9):1305-1315]. As the coarsest resolution level $Q_{M_1}$, $M_1$ points can be selected either randomly or according to a predetermined criterion. For example, in face recognition applications, it is usually easy to roughly locate points such as the nose and the eyes. At the next resolution level, new points are added, preferably in the following manner: $q_{M_l+1}$ is preferably selected as the most distant point from $Q_{M_l}$, and so on. Generally, a sequence of new points $q_{M_l+k}$ can be added according to $q_{M_l+k} = \arg\max_{q_i \in Q_M} d_{Q_M}(q_i, \{q_1, \ldots q_{M_l+k-1}\})$. Taking the first $M_l$ points from the sequence produced in this manner, one obtains $Q_{M_l}$. FIGS. 7a-d show example of data hierarchy construction for multiresolution optimization, where FIGS. 7a-c show three resolution levels constructed using the farthest point sampling algorithm, and FIG. 7d shows geodesic distances from the coarsest grid points.

Assume that at the l-th resolution level, $Q_{M_l} = (q_1, \ldots, q_{M_l})$ were embedded into the model surface S using the iterative minimization algorithm described above. As a result, a set of images $\psi(Q_{M_l}) = \{s_1, \ldots, s_{M_l}'\}$ on the polyhedron approximation of S was obtained. At the next resolution level, a larger set $Q_{M_{l+1}}$ is embedded into S, by solving the minimization problem for $\psi(Q_{M_{l+1}}) = \{s_1, \ldots, s_{M_{l+1}}'\}$. The initialization for the first $M_l$ points is readily available from the solution at the previous level. The initial locations for the remaining points $s'_i$ ($i = M_l + 1, M_l+2, \ldots, M_{l+1}$) are preferably interpolated. For example, $s'_i$ can be initialized with such a point on the polyhedron approximation that the geodesic distances from it to the points $s'_1, \ldots, s'_{M_l}$ are as close as possible to the geodesic distances from $q_i$ to $q_1, \ldots, q_{M_l}$. Formally, $s'_i$ can be expressed as:

$$s'_i = \arg\min_s \sum_{j=1}^{M_l} (d_S(s, s'_j) - d_Q(q_i, q_j))^2. \qquad (EQ. 11)$$

Practically, the minimum can be found by exhaustively searching over all $s_1, s_2, \ldots, s_N$, or even a coarser subset of the model point-cloud. This is because the complexity of such a search is negligible compared to the complexity of the iterative minimization process.

Following is a description of a preferred procedure for interpolating the geodesic distances $d_S(s'_i, s'_j)$ on the polyhedron approximation of the model surface S, according to a preferred embodiment of the present invention. Although the geodesic distance between two arbitrary points $s'_a$ and $s'_b$ is generally unavailable, each point lies inside a triangle with vertices on the grid. Let $s_1$, $s_2$, $s_3$ and $s_{1'}$, $s_{2'}$, $s_{3'}$ be the vertices of the triangles $t_a$ and $t_b$ enclosing $s'_a$ and $s'_b$, respectively. Using the barycentric representation described above, the arbitrary points $s'_a$ and $s'_b$ are identified as $(t_a, \underline{u}_a)$ and $(t_a, \underline{u}_b)$, respectively, where $\underline{u}_a$ and $\underline{u}_b$ are the corresponding barycentric 3-vectors.

Note that the mutual geodesic distances $d_S(s_i, s_{j'})$, $i,j'=1, 2, 3$ are known, because they are geodesic distances between points of the model point-cloud. In one embodiment, the geodesic distance $d_S(s'_a, s'_b)$ is approximated as the average of the above mutual geodesic distances:

$$d_S(s'_a, s'_b) = \frac{1}{3}\sum_{i=1}^{3} d_S(s_i, s_{j'}). \quad \text{(EQ. 12)}$$

By the triangle inequality, the approximation error of such selection has the order of the radius of the largest triangle in the polyhedron.

In another embodiment, the average is replaced by a weighted sum, where the weights are chosen according to proximity of $\underline{u}_a$ and $\underline{u}_b$ to each of the enclosing triangle vertices. Such approximation makes the interpolant $d_S(s'_a, s'_b)$ a smooth function of $\underline{u}_a$ and $\underline{u}_b$. The computational complexity of this procedure is relatively low.

In an additional embodiment, two interpolation steps are employed. In a first such interpolation step an approximation to the geodesic distances $d_S(s'_a, s_{bj})$ between the arbitrary point $s'_a$ and each of the three vertices $s_j$ of $t_b$. The computation of each of these distances can be regarded as the problem of finding an approximation to $d_S(s'_n, s_{1'})$ given $d_S(s_i, s_{1'})$. The solution of this problem is preferably obtained by the following numerical procedure which is referred to herein as "the three-point geodesic distance approximation".

As a starting point, consider the particular case where $s'_b$ is one of the polyhedron vertices. In this case, the distances $d_j = d_S(s_i, s'_b)$ for $i=1, 2, 3$ can be obtained from the matrix $D_S$. It will be assumed without loss of generality that the triangle $s_1$, $s_2$, $s_3$ lies in $\mathfrak{R}^2$ with $s_1$ at the origin and $s_2$ on the horizontal axis, denoting by $\underline{x}_1 = (0, 0)^T$, $\underline{x}_2 = (x_2, 0)^T$ and $\underline{x}_3 = (x_3, y_3)^T$ the planar coordinates of the corresponding vertices. As will be appreciated by one ordinarily skilled in the art, the original triangle can always be brought to this canonical coordinate system by a simple pre-computed transformation. Thus, the actual vertex coordinates $s_i$ in a triangle are not required by the procedure.

Assume that there exists a (virtual) source point $\hat{\underline{x}}_0 = (\hat{x}_0, \hat{y}_0)^T$ in the plane of the triangle, whose Euclidean distance from $\underline{x}_i$ is $d_i$. FIGS. 8a-b illustrate a procedure for finding such virtual "source" point. When the surface S is planar (FIG. 8a), there exists such a point consistent with the data, and it can be found by computing the intersection of three circles of radii $d_i$ centered at the corresponding triangle vertices $\underline{x}_i$.

This gives rise to the following system of quadratic equations:

$$\hat{x}_0^2 + \hat{y}_0^2 = d_1^2$$

$$(\hat{x}_0 - x_2)^2 + \hat{y}_0^2 = d_2^2$$

$$(\hat{x}_0 - x_3)^2 + (\hat{y}_0 - y_3)^2 = d_3^2. \quad \text{(EQ. 13)}$$

Once $\hat{\underline{x}}_0$ is determined, the Euclidean distance $\|\hat{\underline{x}}_0 - \underline{x}\|$ serves as the approximation to the geodesic distance $d_S(x_0, x)$. In the above particular case, the two coincide.

When the surface has non-zero Gaussian curvature (FIG. 8b), only an approximate source $\hat{\underline{x}}_0$ can be found, yet every pair of circles typically intersects at two distinct points. According to a preferred embodiment of the present invention the virtual source is found by a weighted least-squares solution of Equations 13, e.g.:

$$\hat{\underline{x}}_0(X, \underline{d}, \underline{w}) = \text{argmin}_{\underline{x}_0} l(\underline{x}_0; X, \underline{d}, \underline{w}), \quad \text{(EQ. 14)}$$

where $$l(\underline{x}_0; X, \underline{d}, \underline{w}) = \sum_{i=1}^{3} w_i(\|\underline{x}_0 - \underline{x}_i\|^2 = d_i^2)^2, \quad \text{(EQ. 15)}$$

$X = (\underline{x}_1, \underline{x}_2, \underline{x}_3)$, $\underline{d} = (d_1^2, d_2^2, d_3^2)^T$, and $\underline{w} = (w_1, w_2, w_3)^T$ is a vector of weights controlling the influence of each of the vertices (The vector $\underline{w}$ and its components $w_1$, $w_2$ and $w_3$, should not be confused with the set of weights $\{w_{ij}\}_{i,j=1,\ldots,M}$ appearing in Equation 6 above). A preferred procedure for selecting the weights is provided hereinafter.

The least-squares solution can be performed by any way known in the art, such as, but not limited to, using Newton steps. In the embodiment in which Newton steps are employed, the gradient $g$ and the Hessian matrix $H$ of $l(\underline{x}_0; X, \underline{d}, \underline{w})$ with respect to $\underline{x}_0$ are given by $$g = 4(w^T f \cdot x - X \cdot w \otimes f) \quad \text{(EQ. 16)}$$

$$H = 4w^T f \cdot I + 8\sum_{i=1}^{3} w_i(x_0 - x_i)(x_0 - x_i)^T$$

where $(f)_i = \|\underline{x}_0 - \underline{x}_i\|^2 - d_i^2$, and $\underline{w}\widehat{\otimes}\underline{f} = (w_1 f_1, w_2 f_2, w_3 f_3)$ denotes the element-wise (Hadamard) product. When the vertices $\underline{x}_i$ are not collinear, which normally happens in a valid triangulation, the Hessian is full rank for $w_i \ne 0$. When one of the weights, say $w_3$, is zero, the first two equations of Equations 13 are satisfied and hence the first terms of $f$ vanish. Consequently, the first term in the Hessian is zero, whereas the second term is a sum of two outer products of linearly independent vectors, which is full rank. When only one weight, say $w_1$ is non-zero, the Hessian assumes the form $H = 8w_1(\underline{x}_0 - \underline{x}_1)(\underline{x}_0 - \underline{x}_1)^T$, which is a rank one matrix. Since in this case the solution $\hat{\underline{x}}_0$ admits only the first equation of Equations 13, the minimum of $l(\underline{x}_0; X, \underline{d}, \underline{w})$ is achieved on the circle described by the said equation, and the null vector of $H$ corresponds to the tangential direction, in which the function does not change.

The initialization is preferably achieved as follows. First, simultaneous solutions of different pairs of equations from Equations 13 are found, resulting in at most six different points. Then, the minimization procedure is initialized by the one yielding the smallest value of l. Solution of a pair of quadratic equations has an analytic expression. For example, the first two equations yield $$\hat{x}_0 = \frac{d_1^2 - d_2^2 + x_2^2}{2x_2} \quad \text{(EQ. 17)}$$

$$\hat{y}_0 = \pm\sqrt{d_1^2 - \hat{x}_0^2},$$

wherever two, one, or none of the solutions exist. Since by its virtue such an initialization is sufficiently close to the optimal $\hat{x}_0$, convergence is achieved in about two or three iterations.

Lemma 1. Let the vertices $x_i$ be non-collinear and let $\underline{w}$ contain at least two non-zero weights. Then, the first-order derivatives of $\hat{x}_0(X,\underline{d},\underline{w})$ with respect to $\underline{d}$ and $\underline{w}$ are given by:

$$J_w = \nabla_w \hat{x}_0^T = -\underline{G}_w H^{-1}$$

$$J_d = \nabla_d \hat{x}_0^T = -\underline{G}_d H^{-1}, \quad \text{(EQ. 18)}$$

where $\underline{G}_w = \nabla_w \underline{g}^T$ and $\underline{G}_d = \nabla_d \underline{g}^T$ are given by $$\underline{G}_w = 4F(x_0 \underline{1}^T - X)$$

$$\underline{G}_d = -4W(x_0 \underline{1}^T - X), \quad \text{(EQ. 19)}$$

W and F are, respectively, diagonal matrices containing the elements of $\underline{w}$ and f on the diagonal, and $\underline{1} = (1, 1, 1)^T$.

For the proof of lemma 1, see the Appendix section that follows.

Having the approximant of the virtual source $\hat{x}_0(X,\underline{d},\underline{w})$ and its first-order derivatives, the three-point geodesic distance approximant $\hat{d}_S$ and it derivatives can be calculated from the following equations:

$$\hat{d}_S^2(\underline{x};X,\underline{d},\underline{w}) = \|\underline{x} - \hat{x}_0(X,\underline{d},\underline{w})\|^2, \quad \text{(EQ. 20)}$$

$$\nabla_x \hat{d}_S^2(\underline{x};X,\underline{d},\underline{w}) = 2(\underline{x} - \hat{x}_0)$$

$$\nabla_w \hat{d}_S^2(\underline{x};X,\underline{d},\underline{w}) = 2J_w(\hat{x}_0 - \underline{x})$$

$$\nabla_d \hat{d}_S^2(\underline{x};X,\underline{d},\underline{w}) = 2J_d(\hat{x}_0 - \underline{x}). \quad \text{(EQ. 21)}$$

When $s'_a = (t_a, \underline{u}_a)$ is given in normalized barycentric coordinates $(u_1 + u_2 + u_3 = 1)$, $\underline{x}$ can be expressed as $\underline{x} = X \underline{u}_a = u_1 x_1 + u_2 x_2 + u_3 x_3$, where $X$ is a pre-computed matrix defining the geometry of the triangle $t_a$. Hence, the present embodiments successfully provide a tool for calculating the approximate geodesic distance $\hat{d}_S^2(s'_a, s'_b)$ given $\underline{d} = (d_S^2(s_1, s'_b), d_S^2(s_2, s'_b), d_S^2(s_3, s'_b))^T$ and a vector of weights $\underline{w}$. The derivatives of $\hat{d}_S^2$ with respect to $\underline{u}_a$ are obtained using the chain rule, $\nabla_u \hat{d}_S^2 = X^T \nabla_x \hat{d}_S^2(Xu)$.

Following is a preferred procedure for calculating the weights vector $\underline{w}$. According to a preferred embodiment of the present invention the weights $\underline{w}$ are proportional to $\underline{u}_a$, the barycentric coordinates of $s'_a$. Since inside the triangle $u_i > 0$, the weights are preferably set to some positive values inside the triangle. When $s'_a$ is located on the edge $\overline{s_2 s_3}$, $u_1 = 0$ and $w_1$ is preferably set to zero. This cancels the influence of the vertex $s_1$ in the least squares problem. Hence, the same vertices participate with the same weights when $\hat{d}_S^2$ is computed both from the triangle $s_1, s_2, s_3$ and the adjacent triangle $s_2, s_3, s_4$, yielding a continuous transition of $\hat{d}_S^2$ across the edge.

In various exemplary embodiments of the invention a $C^1$ continuity for $\hat{d}_S^2$ is enforced such that a change of $\underline{u}_a$ by a unit vector $\Delta \underline{u}_a$ and a change of $\underline{u}_b$ by a unit vector. $\Delta \underline{u}_b$ displace the point $\underline{x}$ inside the triangles $t_a$ and $t_b$ by the same Euclidean distance. Since barycentric coordinates are defined up to scale, $C^1$ continuity can be enforced by selecting an appropriate scaling for $\underline{u}_a$ and $\underline{u}_b$.

Since the least-squares problem (Equation 14) is under-determined when one of the weights is set to zero and generally yields two distinct solution, the solution is preferably selected consistent with the case when the weight is slightly larger than zero. In practice, the second inconsistent solution can be avoided by setting the weight to some small positive constant $\epsilon$ rather than strictly to zero. At the triangle vertices, two weights vanish, which makes the least squares problem under-determined. In this case, however, there is no need for the least squares solution, since the geodesic distances between the triangle edges to $s'_b$ are known.

The approximate geodesic distance from $s'_a$ to $s'_b$ is preferably calculated in two steps. In a first step, a triplet of approximate geodesic distances $\hat{d}_S(s'_a, s_{i'})$ from $s'_a$ to $s_{i'}$, $i' = 1, 2, 3$, is calculated using the expression $\hat{d}_S^2(s'_a, s_{i'}) = \hat{d}_S^2(u_a; X, \underline{d}_i, \underline{w} = \underline{u}_a)$ where $X$ is a matrix with the canonical coordinates of $s_1, s_2, s_3$, and $\underline{d}_i = (d_S^2(s_1, s_{i'}), d_S^2(s_2, s_{i'}), d_S^2(s_3, s_{i'}))^T$. In a second step, the approximate geodesic distance $\hat{d}_S(s'_a, s'_b)$ from $s'_a$ to $s'_b$ is calculated by operating in the triangle $t_b$. $\hat{d}_S(s'_a, s'_b)$ is calculated using the expression $\hat{d}_S^2(s'_a, s'_b) = \hat{d}_S^2(\underline{u}_b; X', \hat{\underline{d}}, \underline{w} = \underline{u}_b)$, where $\hat{\underline{d}}$ is a vector of distances defined as $\hat{\underline{d}} = (\hat{d}_S^2(s_a, s_{1'}), \hat{d}_S^2(s_a, s_{2'}), \hat{d}_S^2(s_a, s_{3'}))^T$, and $X'$ is a matrix with the canonical coordinates of $s_{1'}, s_{2'}, s_{3'}$.

Using the chain rule, it is straightforward to show that the derivatives of $\hat{d}_S^2(s'_a, s'_b)$ with respect to $\underline{u}_a$ and $\underline{u}_b$ are given by $$\nabla_{u_b} \hat{d}_S^2(s'_a, s'_b) = \nabla_{u_a} \hat{d}_S^2(u_b; X', \hat{d}, u_b) + \nabla_w \hat{d}_S^2(u_b; X', \hat{d}, u_b)$$

$$\nabla_{u_a} \hat{d}_S^2(s'_a, s'_b) = (\nabla_{u_a} \hat{d}_1^2, \nabla_{u_a} \hat{d}_2^2, \nabla_{u_a} \hat{d}_3^2)^T \nabla_d \hat{d}_S^2(u_b; X', \hat{d}, u_b), \quad \text{(EQ. 21)}$$

where $\nabla_{u_a} \hat{d}_i^2 = \nabla_{u_a} \hat{d}_S^2(u_a; X, d_i, u_a) + \nabla_w \hat{d}_S^2(u_a; X, d_i, u_a)$.

Following is a description of a procedure for selecting the subset which corresponds to the patch $Q' \subset Q$, according to a preferred embodiment of the present invention. The procedure can be used for executing method step 11 (see FIG. 1). The procedure can also be used by subset selector 28 of apparatus 20. As stated, the subset preferably includes only points for which the metric on $Q'$ is consistent with the metric on $Q$. Specifically, geodesics of $Q$ that pass through points not in $Q'$ may give rise to inconsistent distances and are preferably removed from the subset.

Formally, index pairs $(i,j) \in \{1, 2, \ldots, M'\} \times \{1, 2, \ldots, M'\}$ for which $d_Q(q_i, q_j) \neq d_{Q'}(q_i, q_j)$ are excluded from the subset, where $M'$ is the size of the point-cloud representing the patch $Q'$. Typically, the point-cloud of $Q'$ is already known (this is a common situation, for example, in face recognition, where one has the full probe surface but wishes to deliberately remove some parts of it). In this case the pairs of points satisfying $|d_Q(q_i, q_j) - d_{Q'}(q_i, q_j)| \geq \delta$ where $\delta$ is a predetermined parameter, are preferably excluded. When the point-cloud of $Q'$ is not known, the minimal geodesics may change due to the change in the boundary of $Q$. In this case pairs of for which $|d_Q(q_i, \partial Q') + d_{Q'}(q_j, \partial Q')| < d_{Q'}(q_i, q_j)$, where $\partial Q'$ is the boundary of $Q'$ are preferably excluded.

FIGS. 9a-b are schematic illustrations of particular situations in which a planar patch is partially embedded of in a plane. FIG. 9a illustrates the partial embedding after the exclusion of inconsistent distances. The solid line in FIG. 9a corresponds to an inconsistent distance between two points that is preferably excluded from the subset, and the dashed line corresponds to the consistent geodesic distance between the two points. FIG. 9b, illustrates the embedding result when the inconsistent distances are not excluded.

Additional objects, advantages, and novel features of the present invention will become apparent to one ordinarily skilled in the art upon examination of the following examples and appendix, which are not intended to be limiting. Additionally, each of the various embodiments and aspects of the present invention as delineated hereinabove and as claimed in the claims section below finds experimental and theoretical support in the following examples and appendix.

EXAMPLES

Reference is now made to the following examples, which together with the above descriptions, illustrate the invention in a non limiting fashion.

Example 1

Partial Embedding Distance Between Spherical Patches

Embodiments of the present invention have been employed for the purpose of determining similarity between a unit two-dimensional sphere sampled at 3200 points, and spheres with radii ranging from 0.5 to 2.5 sampled at a smaller number of points according to the farthest point sampling strategy with a random seed. Ten random samplings were used for each radius. The similarity measures used in the present example were the $l_2$-norm partial embedding distance, $d_{PE}^2$, using M=100 points, and the $l_\infty$-norm partial embedding distance, $d_{pE}$, using 100, 250 and 500 points. The partial embedding distances were computed according to a preferred embodiment of the present invention using the multi-resolution minimization algorithm.

As a reference, a canonical form distance $d_{CF}$ [see U.S. Pat. No. 6,947,579 and Elad et al., supra] sampled at M=100, 200, 250, 300 and 500 points was also calculated.

FIGS. 10$a$-$b$ show the normalized distances as a function of the sphere radius. Shown in FIGS. 10$a$-$b$ is the calculation of $d_{PE}^2$ (top line of FIG. 10$a$), $d_{PE}$ (top line of FIG. 10$b$) and the five calculations of $d_{CE}$ canonical form distance (bottom lines of FIGS. 10$a$ and 10$b$). The numbers on the plots stand for the number of points used for distance computation.

FIGS. 11$a$-$c$ show the normalized distances for radii in the range of 0.88 to 1.1, calculated using $d_{PE}^2$ with 50 points (FIG. 11$a$), and using $d_{CF}$ with 100 (FIG. 11$b$) and 500 (FIG. 11$a$) points. Also indicated in FIGS. 11$a$-$c$ are intervals of sphere radii that fall below the sensitivity threshold of the distance measure are indicated. The grayed areas in FIGS. 11$a$-$c$ represent the variance of the distance computed for the ten different samplings of the spheres. This variance makes spheres within a certain interval of radii around R=1 indistinguishable by the distance function.

The partial embedding distance appears to be extremely sensitive to the geometry of the surfaces. A change as small as 0.1% in the spherical patch radius (from 1.000 to 0.999) increases $d_{PE}^2$ by a value exceeding the variance due to sampling. Similar results are achieved using the $l_1$-norm partial embedding distance, $d_{PE}^1$ and slightly inferior with the $l_\infty$-norm partial embedding distance, $d_{PE}^2$. For comparison, with the same number of points (100), $d_{CF}$ was unable to discern between spheres differing in radius by more than 10%. Increasing the number of points to 500 makes $d_{CF}$ sensitive to radius differences of about 2.64%, which is still one order of magnitude below the sensitivity of the similarity measure of the present embodiments. It is therefore demonstrated that the present embodiments are capable of accurately determining similarity between surfaces.

The objective function (Equation 6) and its gradient implemented in C were evaluated in about 40 ms on a Pentium® IV PC for M=100 points. The entire computation of $d_{PE}$ using non-optimized MATLAB® software and a C code took was completed in about 10-60 seconds.

Example 2

Gromov-Hausdorff Distance Between Isometric Surfaces

Embodiments of the present invention have been employed for calculating similarity measure between surfaces and their approximate isometrics for different articulated objects. The surfaces were represented by polyhedral meshes obtained by triangulation.

FIGS. 12$a$-$f$, illustrate the articulated objects used in the present example. Shown in FIGS. 12$a$-$f$ are illustration of human (FIG. 12$a$), dog (FIG. 12$b$), giraffe (FIG. 12$c$), crocodile (FIG. 12$d$), paper (FIG. 12$e$) and spider (FIG. 12$f$), and their approximate isometries. Also shown in FIGS. 12$a$-$f$ are the parameters of the corresponding polyhedral approximation (number of vertices, faces and edges) for each surface.

The similarity measures used in the present example were the $l_2$-norm Gromov-Hausdorff distance, $d_{GH}^2$, and the $l_\infty$-norm Gromov-Hausdorff distance, $d_{GH}$. The embedding spaces consisted of the full-density meshes and the probe surfaces were meshes sampled at M=N=50 points. Optimization was performed in accordance with preferred embodiments of the present invention using the multi-resolution scheme. Geodesic distances were computed using the fast marching method for triangulated domains.

As a reference, the canonical form distance was computed between the surfaces, by comparing a full-density canonical form to canonical forms sampled at M=100, 250 and 600 points as well as to full-density canonical forms. Moment signatures and the iterative closest point algorithm were used to compare between the canonical forms.

FIGS. 13$a$-$d$ show dissimilarity matrices obtained using $d_{GH}^2$ (FIG. 13$a$), $d_{GH}$ (FIG. 13$b$), $d_{CF}$ with M=600 (FIG. 13$c$) and full-density $d_{CF}$ (FIG. 13$d$) as the similarity measure. As shown the present embodiments successfully recognize all the objects using $d_{GH}^2$ as well as $d_{GH}$, although the sampling included a relatively small number of points (M=N=50). On the other hand, the best result of $d_{CF}$ with full-density canonical forms and iterative closest point yielded about 11% equal error rate.

FIGS. 14$a$-$c$ show proximity pattern representing the dissimilarities between the objects using $d_{GH}^2$ (FIG. 14$a$), $d_{CF}$ with M=600 (FIG. 14$b$) and full-density $d_{CF}$ (FIG. 14$c$) as the similarity measure. Each point in FIGS. 14$a$-$c$ represents an object, and an Euclidean distance between two points represents dissimilarity between the corresponding objects. As shown the clusters obtained using embodiments of the present invention (FIG. 14$a$) are significantly tighter as compared to the clusters obtained using $d_{CF}$. The objects dog and paper exhibit larger intra-cluster dissimilarities, which we attribute to larger deviations from isometricity.

The discriminative power of $d_{GH}^2$, $d_{GH}$ and $d_{CF}$ was quantified using a separability measure a defined as:

$$\sigma = \min_n \left\{ \frac{\min_{i,j,m\neq n} d(S_{mi}, S_{mj})}{\max_{i,j} d(S_{ni}, S_{nj})} \right\}, \quad (EQ.\ 22)$$

where $S_{ni}$ denotes the ith instance of the nth object, and d is the Euclidean distance between the corresponding points. σ expresses the "worst-case" ratio between the inter-cluster and the intra-cluster distances. Thus, higher values of σ correspond to higher discriminative power between the objects. It was found that the embodiments of the present invention were superior to the reference method. For example, for $d_{GH}^2$ the separability measure was σ=3.47, while for $d_{CF}$ the separability measure was σ≦0.58.

Increasing the number of points from 100 to 600 in $d_{CF}$ increases the computational complexity with small or no benefit in accuracy. Starting from about 250 points, the use of iterative closest point in the computation of the canonical form distance gives negligible accuracy improvement compared to the faster moment signature comparison. It is therefore concluded that in the present experiment, the discriminative power of the canonical form distance is essentially limited by metric distortion introduced by the embedding of the surface into a three-dimensional Euclidian space.

Example 3

Partial Embedding Distance Between Isometric Surfaces

Embodiments of the present invention have been employed for calculating similarity measure between model surfaces and probe surfaces for which the known geometrical information is only partial. The model surfaces were the polyhedral meshes of Example 2, see FIGS. 12a-f, and the probe surfaces are illustrated in FIGS. 15a-f. The solid parts of the surfaces represent the known geometrical information of the probe surfaces.

The similarity measures used in the present example were the $l_2$- and $l_\infty$-norms partial embedding distances, $d_{PE}^2$ and $d_{PE}$, respectively. The embedding spaces consisted of the full-density meshes and the probe surfaces were meshes sampled at M=N=50 points. Optimization was performed in accordance with preferred embodiments of the present invention using the multi-resolution scheme. The objective function and its gradient were implemented in C.

Perfect matching was achieved by both similarity measures, yielding separability measure a of 1.62 and 1.29 for $d_{PE}^2$ and $d_{PE}$, respectively.

Example 4

Face Recognition Experiment

Embodiments of the present invention have been applied to a toy face recognition problem of 20 faces taken from the Notre Dame database [Chang et al., "Face recognition using 2D and 3D facial data," ACM Workshop on Multimodal User Authentication, 2003, pages 25-32; Flynn et al., "Assessment of time dependency in face recognition: an initial study," Audio- and Video-Based Biometric Person Authentication, 2003, pages 44-51].

As models, four different faces were used. Each model contained approximately 4000 points and was represented using global parameterization. As probes, faces of the same subjects with different facial expressions were used (four probes per subject). The probes were cropped using geodesic mask [Bronstein et al., "Three-dimensional face recognition," Intl. J. Computer Vision, 2005, 64(1):5-30] (leaving the nose and the forehead region) and subsampled using farthest point sampling to 53 points.

The similarity measures used in the present example were the $l_2$- and $l_\infty$-norms partial embedding distances, $d_{PE}^2$ and $d_{PE}$, respectively. All distances were computed numerically using a version of parametric fast marching method. For 53 points, the computation time of the objective function and its gradient is about 20 ms on a Pentium® IV PC.

FIGS. 16a-d show four model facial surfaces, referred to below as models 1-4, respectively.

FIGS. 17a-b present the similarity matrix using $d_{PE}$ (FIG. 17a) and $d_{PE}^2$ (FIG. 17b). The bars on the right hand side of FIGS. 17a-b are on logarithmic scale. In both cases a perfect discrimination between different subjects was achieved with equal error rate which is consistent with zero, although the sampling included a relatively small number of points (53). It is noted that such discrimination ability cannot be achieved using the canonical form approach even when thousands of sample points are used.

FIGS. 18a-b show local maps of the objective function as calculated for two different subjects into a model surface. Shown in FIGS. 18a-b are the embedding of subject 1, probe 4 into model 1 (FIG. 18a), and the embedding of subject 2, probe 4 into model 1 (FIG. 18b).

The bar on the right hand side of FIGS. 18a-b depicts local values F(k) of the objective function at point k: $F(k)=\max_i |d_S(u_k,u_i)-d_Q(q_k,q_i)|$. F(k) describes the contribution of the k-th point to the objective function. As shown, the objective function is significantly higher when a probe of a different subject is embedded into the model surface.

APPENDIX

Reference is now made to the following appendix, which together with the above descriptions, illustrates the invention in a non limiting fashion. Various embodiments and aspects of the present invention as delineated hereinabove and as claimed in the claims section below find theoretical support in the following appendix.

Mathematical Definitions and Notations

The term "r-covering" when used in connection to a particular continuous space S, refers to a continuous subset $S^r \subset S$ such that:

$$S = \bigcup_{s \in S^r} B_S(s, r) \quad \text{(EQ. A1)}$$

where $B_S(s_0,r)=\{s \in S: d_S(s,s_0)<r\}$ is an open ball of radius r centered at $s_0$ in S. The space $(S, d_S|_{S^r})$ has a restricted metric $d_S|_{S^r}$ obtained by restricting the metric $d_S$ to the subset $S^r$: $d_S|_{S^r}=d_S(s, s') \forall s,s' \in S^r$.

The term "bounded continuous surface" refers to a continuous surface S for which $\sup_{s,s' \in S} d_S(s, s')$ is finite. S is referred to as a "compact surface" if each of its open covers has a finite sub-cover. If S is compact it is necessary bounded.

The term "ε-isometry" refers to a mapping $\phi: S \to Q$, for which for every $q \in Q$ there exists $s \in S$ such that $d_Q(q, \phi(s)) \leq \varepsilon$.

The term "ε-isometric spaces" refers to spaces for which there exists an ε-isometry.

An image $\phi(S)$ of a space S in a space Q is referred to as an "ε-Hausdorff approximation" of S in Q if the mapping $\phi: S \to Q$ is an ε-isometry.

Properties of the Gromov-Hausdorff Distance

The Gromov-Hausdorff distance $d_{GH}$ (Equation 4) enjoys the following properties which make it useful for determining similarities between surfaces.

The Gromov-Hausdorff distance is a finite metric on the space M of is continuous compact surfaces, in which a point is defined as an equivalence class of a continuous surface and its isometries. In other words, $d_{GH}$ satisfies the following axioms: (i) $d_{GH}(S, Q) \geq 0$; (ii) $d_{GH}(S, Q)$ if and only if S and Q are isometric; (iii) $d_{GH}(S, Q) = d_{GH}(Q, S)$; and (iv) $d_{GH}(R, Q) \leq d_{GH}(R, S) + d_{GH}(S, Q)$, also known as the triangle inequality, where S, Q and R are continuous surfaces.

Another property of the Gromov-Hausdorff distance is the near-isometric similarity, which can be formulated as follows: (i) if $d_{GH}(S, Q) \leq \epsilon$, where S, Q are continuous surfaces, then there exists a $2\epsilon$-Hausdorff approximation of S in Q. The converse version of the near-isometric similarity can be formulated as follows: (ii) if there exists an $\epsilon$-Hausdorff approximation of S in Q, then $d_{GH}(S, Q) \leq 2\epsilon$.

An additional property of the Gromov-Hausdorff distance is sampling consistency which can be formulated as follows: Given $Q^r$ an r-covering of a continuous surface Q and $S^{r'}$ an r'-covering of a continuous surface S, $|d_{GH}(S, Q) - d_{GH}(S^{r'}, Q^r)| \leq r + r'$.

Thus, the Gromov-Hausdorff distance between sampled versions of two surfaces is close to the Gromov-Hausdorff distance between the original surfaces, and the discrepancy vanishes as the sample radius decreases.

The above properties of the Gromov-Hausdorff distance are known in the art and their proofs are found in many publications (to this end see, e.g., F. Mémoli and G. Sapiro, "A theoretical and computational framework for isometry invariant recognition of point cloud data," University of Minnesota, IMA preprint 2004; and I. Borg and P. Groenen, "Modern multidimensional scaling—theory and applications," Springer-Verlag, Berlin Heidelberg New York, 1997].

Properties of the Partial Embedding Distance

The partial embedding distance $d_{PE}$ (Equations 2-3) of the present embodiments enjoys several properties which make it useful for determining similarities between surfaces. Intuitively, $d_{PE}$ measures the metric distortion obtained trying to embed the probe surface Q into the model surface S in the "most isometric" way. $d_{PE}$ can be considered as a part of the Gromov-Hausdorff distance $d_{GH}$.

As will be proven below, although $d_{PE}$ is not a metric per se it satisfies some of the metric axioms: (i) positive definiteness, $d_{PE}(S,Q) \geq 0$; (ii) minimality $d_{PE}(S,Q) = 0$ if and only if Q is isometrically embeddable into S; (iii) and a non-symmetric version the triangle inequality $d_{PE}(S,Q) \leq d_{PE}(S,R) + d_{PE}(R, Q)$, where S, Q and R are continuous surfaces.

The positive definiteness property follows directly from the definition of $d_{PE}$ since dis $\psi \geq q$.

The proof of the minimality property is as follows. If Q is isometrically embeddable into S, there exists a mapping $\psi$: Q→S with dis $\psi = 0$, which proves the first direction of this property. For the second direction, if $d_{PE}(S,Q) = 0$ then there exists a sequence of mappings $\{\psi_n: Q \to S\}$ satisfying dis $\psi_n \leq 1/n$. Fix a countable dense set $Q' \subset Q$. Using the Cantor diagonalization procedure, a subsequence $\{\psi_{n_k}\}$ can be chosen such that for every $q' \in Q'$ the sequence $\{\psi_{n_k}(q')\}$ converges in S, where $Q' \subset Q$ is a fixed countable dense set. Assume, without loss of generality, that such a sequence is $\{\psi_n\}$ itself. A mapping $\psi$: Q'→S can then be defined as the point-wise limit of $\{\psi_n\}$, namely $\psi(q') = \lim_{n \to \infty} \psi_n(q')$ for every $q' \in Q'$. Since $|d_S(\psi_n(q''), \psi_n(q')) - d_Q(q'', q')| \leq$ dis $\psi_n \to 0$, it follows that:

$$d_S(\psi(q''),\psi(q'))=\lim_{n\to\infty}d_S(\psi_n(q''),\psi_n(q'))=d_Q(q'',q') \quad \text{(EQ. A2)}$$

for all q, q'∈Q'. Thus, $\psi$ is a distance-preserving embedding of Q' into S. Since Q' is dense, $\psi$ can be extended to a distance-preserving embedding of the entire Q into S (see, for example, Proposition 1.5.9 in Burago et al., "A course in metric geometry," American Mathematical Society, 2001).

The proof of the triangle inequality property is as follows. Let $d_{PE}(R, Q) = \delta_1$ and $d_{PE}(S, R) = \delta_2$. Then, there exist two sequences of mappings $\{\phi_n: Q \to R\}$ and $\{\psi_n: R \to S\}$, satisfying dis $\phi_n \leq 2\delta_1 + 1/n$ and dis $\psi_n \leq 2\delta_2 + 1/n$. Denote by $\{\zeta_n: Q \to S\}$ the sequence of the compositions $\zeta_n = \psi_n \circ \phi_n$. Invoking the triangle inequality for real numbers, one obtains:

$$|d_S(\zeta_n(q), \zeta_n(q')) - d_Q(q, q')| \leq \quad \text{(EQ. A3)}$$
$$|d_S(\zeta_n(q), \zeta_n(q')) - d_R(\varphi_n(q), \varphi_n(q'))| +$$
$$|d_R(\varphi_n(q), \varphi_n(q')) - d_Q(q, q')| \leq$$
$$dis\varphi_n + dis\psi_n < 2(\delta_1 + \delta_2) + \frac{2}{n}.$$

for all q, q'∈Q'. This proves the triangle inequality property because dis $\zeta_n \leq 2(\delta_1 + \delta_2 + 1/n)$ and $d_{PE}(S, Q) \leq \delta_1 + \delta_2$. Q.E.D Another property of $d_{PE}$ is the near-isometric similarity, which can be formulated as follows: if there exist an $\epsilon$-Hausdorff approximation of a continuous surface S in a continuous surface Q then $d_{PE}(S, Q) \leq 2\epsilon$. This property follows straightforwardly from the fact that $d_{PE}(S, Q) \leq d_{GH}(S, Q)$. It can be shown that the converse version of this property also applies.

An additional property of $d_{PE}$ is the sampling consistency: given $Q^{r'}$ an r'-covering of a continuous surface Q and $S^{r'}$ an r'-covering of a continuous surface S, $d_{PE}(S, Q) - r \leq d_{PE}(S^{r'}, Q') \leq d_{PE}(S, Q) + r'$. The proof of the sampling consistency property is presented below and is divided into two separate statements: (i) $d_{PE}(S, Q) - r \leq d_{PE}(S, Q^{r'}) \leq d_{PE}(S, Q)$; and (ii) $d_{PE}(S, Q) \leq d_{PE}(S^{r'}, Q) \leq d_{PE}(S, Q) + r'$.

The right side of inequality (i) is straightforward, since $$\sup_{q,q'\in Q'}|d_{Q'}(q,q')-d_S(\psi(q),\psi(q'))| \leq \sup_{q,q'\in Q}|d_Q(q,q')-d_S(\psi(q),\psi(q'))|. \quad \text{(EQ. A4)}$$

The left side of inequality (i) can be shown by invoking the triangle inequality property which yields $d_{PE}(S,Q) \leq d_{PE}(S, Q^r) + d_{PE}(Q^r,Q)$. It remains to show that $d_{PE}(Q^r,Q) \leq r$. Let the mapping $\psi$: Q→$Q^r$ be defined in the following way: for $q \in Q^r$, $\psi(q) = q$, and for $q \in Q \setminus Q^r$ $\psi(q) = \arg\min_{q' \in Q^r} d_Q(q, q')$. It is noted that the minimum exists because $Q^r$ can be replaced by its finite sub-covering. From the fact that $Q^r$ is an r-covering, it follows that $d_Q(q, \psi(q)) \leq r$. Let $q_1, q_2$ be two points in Q; if both $q_1$ and $q_2$ are in $Q^r$, then $|d_Q(q_1, q_2) - d_Q(\psi(q_1), \psi(q_2))| = 0$. If both $q_1$ and $q_2$ are in $Q^r$, invoking the triangle inequality one obtains $|d_Q(q_1, q_2) - d_Q(\psi(q_1), \psi(q_2))| \leq d_Q(q_1, \psi(q_1)) + d_Q(q_2, \psi(q_2)) \leq 2r$. Similarly, when only $q_1$ is in $Q^r$, $|d_Q(q_1, q_2) - d_Q(\psi(q_1), \psi(q_2))| \leq r$. Hence, dis $\psi \leq r$.

The left side of inequality (ii) is straightforward. To show the right side of inequality (ii), let $\psi$ be a mapping $\psi$: Q→S. A new mapping $\tilde{\psi}$: Q→$S^{r'}$ is defined in the following way:

$$\tilde{\psi}(q) = \begin{cases} \psi(q) & \psi(q) \in S^{r'} \\ \arg\min_{s \in S^{r'}} d_S(s, \psi(q)) & \text{else.} \end{cases} \quad \text{(EQ. A5)}$$

Since $S^{r'}$ is an r'-covering of S, $$\sup_{q,q'\in Q}|d_Q(q,q')-d_S(\tilde{\psi}(q),\tilde{\psi}(q'))| \leq \sup_{q,q'\in Q}|d_Q(q,q')-d_S(\psi(q),\psi(q'))|+2r' \quad \text{(EQ. A6)}$$

for all $\psi$, and consequently $d_{PE}(S^{r'}, Q) \leq d_{PE}(S, Q) + r'$. Q.E.D.

A further property of $d_{PE}$ is referred to as the partial matching property, and is formulated as follows: given Q' an r-covering of a continuous surface Q, $d_{PE}(Q^r, Q)=0$. The proof of this property follows directly from the fact that $Q^r$ is a subspace of Q with a restricted metric $d_{Q|Q^r}(q, q')=d_Q(q, q')$ for all q, q' in $Q^r$. Thus, there exists a trivial isometric embedding of $Q^r$ into Q. It is noted that by virtue of this property (unlike the corresponding property of the Gromov-Hausdorff distance $d_{GH}(Q, Q^r) \leq r$), $d_{PE}$ can be used for partial matching of surfaces.

Proof of Lemma 1

The proof of lemma 1 is presented below for the derivation of $J_w$ (Equation 18). One of ordinary skill in the art would know how to derive $J_d$ according to the similar principles. The proof of lemma 1 starts with the derivative with respect to w. By Equation 14, $\hat{x}_0$ is a local minimum of $l(x_0;X,d,w)$, hence, where g stands for the gradient $\nabla_{x_0} l$. Adding an infinitesimal perturbation to w results in $g(\hat{x}_0;X,d,w+dw)\neq 0$, yet there exists an infinitesimal perturbation $d\hat{x}_0$, such that $g(\hat{x}_0+d\hat{x}_0;X,d,w+dw)=0$. From the first-order Taylor expansion, it follows that:

$$g(\hat{x}_0+d\hat{x}_0;X,d,w+dw) \approx g(\hat{x}_0;X,d,w)+H(\hat{x}_0;X,d,w)d\hat{x}_0+G_w^T(\hat{x}_0;X,d,w)dw, \quad \text{(EQ. A9)}$$

where H is given in Equation 16. Substituting $g(\hat{x}_0;X,d,w)=0$ and neglecting second-order terms, the following equation is obtained:

$$Hd\hat{x}_0+G_w^T dw=0. \quad \text{(EQ. A8)}$$

Since for non-collinear $x_i$ and at most one zero weight the Hessian is invertible, $$d\hat{x}_0=-H^{-1}G_w^T dw \quad \text{(EQ. A9)}$$

$J_w$ can then be straightforwardly obtained from Equation A9. Q.E.D

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of determining similarity between a non-planar probe surface represented by a probe point-cloud and a non-planar model surface represented by a model point-cloud, the surfaces representing physical objects, the method comprising:

calculating a matrix of geodesic distances characterizing said non-planar model surface represented by said model point-cloud;

embedding said probe surface into an embedding space having a non-constant sectional curvature, wherein said embedding space is a polyhedral approximation of the model surface;

defining an objective function based on said embedding space adapted to map either said probe surface onto said model surface or said model surface onto said probe surface; and wherein said objective function is selected so as to allow calculation of at least one of: a partial embedding distance between the probe surface and the model surface; and a Gromov-Hausdorff distance between the probe surface and the model surface;

calculating an extremal value of said objective function by an iterative process, said iterative process comprising starting with a plurality of initial values of the optimization variables of the objective function, and iteratively updating the locations on said model surface so as to produce a decreasing sequence of function values; wherein said iterative process is selected from the group consisting of the steepest descent method, the fixed step gradient method, the conjugate gradient method, the Newton method, coordinate-wise descent and any combination thereof; and determining similarity between the probe surface and the model surface based on said extremal value.

2. A method of searching a library of non-planar model surfaces for at least a partial match to a non-planar probe surface, the non-planar probe surface being represented by a probe point-cloud and each non-planar model surface being represented by a model point-cloud, the method comprising, for each non-planar model surface, performing the method of claim 1 so as to determine similarity between the probe surface and said model surface, thereby determining the presence or absence of at least a partial match.

3. The method of claim 1, wherein said calculation of said extremal value comprises multiresolution optimization.

4. The method of claim 1, further comprising selecting a subset of the probe point-cloud corresponding to a predetermined patch of the probe surface, wherein said calculation of said extremal value is based on said subset.

5. The method of claim 4, wherein said geodesic distances are calculated using the fast marching method.

6. The method of claim 1, further comprising constructing said polyhedral approximation from the model point-cloud.

7. The method of claim 1, wherein said objective function comprises a sum of local distortions, each characterizing embedding of a pair of points in the probe point-cloud into said embedding space.

8. The method of claim 7, wherein said sum is a weighted sum.

9. The method of claim 7, wherein a plurality of said local distortions in said sum comprise a function of the difference between a first geodesic distance defined in the probe surface and a second geodesic distance, corresponding to said first geodesic distance and being defined in said embedding space.

10. The method of claim 9, wherein said first geodesic distance characterizes a pair of points of the probe point-cloud and said second geodesic distance characterizes images of said pair of points.

11. The method of claim 9, wherein said first geodesic distance characterizes a pair of points of the embedding space and said second geodesic distance characterizes images of said pair of points.

12. The method of claim 9, wherein said first geodesic distance is a distance between a first point of the probe point-cloud and an image of a first point of said embedding space, and said second geodesic distance is a distance between a second point of said embedding space and an image of a second point of the probe point-cloud.

13. The method of claim 1, wherein said probe surface and said model surface represent faces.

14. Apparatus for determining similarity between a non-planar probe surface represented by a probe point-cloud and a non-planar model surface represented by a model point-cloud, the apparatus comprising:
 a extremal value calculator, for calculating a extremal value of an objective function describing embedding of said probe surface into an embedding space having a non-constant sectional curvature according to a method comprising:
  defining an objective function based on said embedding space adapted to map either said probe surface onto said model surface or said model surface onto said probe surface; and wherein said objective function is selected so as to allow calculation of at least one of: a partial embedding distance between the probe surface and the model surface; and a Gromov-Hausdorff distance between the probe surface and the model surface, and
  calculating an extremal value of said objective function by an iterative process, said iterative process comprising starting with a plurality of initial values of the optimization variables of the objective function, and iteratively updating the locations on said model surface so as to produce a decreasing sequence of function values; wherein said iterative process is selected from the group consisting of the steepest descent method, the fixed step gradient method, the conjugate gradient method, the Newton method, coordinate-wise descent and any combination thereof;
 a matrix calculator for calculating a matrix of geodesic distances corresponding to the probe point-cloud, wherein said embedding space is a polyhedral approximation of the model surface; and
 a similarity determinator operable to determine the similarity between the probe surface and the model surface based on said extremal value.

15. The apparatus of claim 14, wherein said extremal value calculator is operable to employ multiresolution optimization.

16. The apparatus of claim 14, further comprising a subset selector for selecting a subset of the probe point-cloud corresponding to a predetermined patch of the probe surface, wherein said extremal value calculator is operable to use said subset for calculating said extremal value.

17. The apparatus of claim 14, further comprising a polyhedron constructor for constructing said polyhedral approximation from the model point-cloud.

18. The apparatus of claim 14, wherein said objective function comprises a sum of local distortions, each characterizing embedding of a pair of points in the probe point-cloud into said embedding space.

19. The apparatus of claim 18, wherein at least a plurality of said local distortions in said sum comprise a function of the difference between a first geodesic distance defined in the probe surface and a second geodesic distance, corresponding to said first geodesic distance and being defined in said embedding space.

20. The apparatus of claim 14, wherein said geodesic distances are calculated using the fast marching method.

* * * * *